(12) United States Patent
Miess et al.

(10) Patent No.: US 9,381,620 B1
(45) Date of Patent: Jul. 5, 2016

(54) METHODS OF FABRICATING POLYCRYSTALLINE DIAMOND COMPACTS

(71) Applicant: US SYNTHETIC CORPORATION, Orem, UT (US)

(72) Inventors: David P. Miess, Highland, UT (US); Michael A. Vail, Genola, UT (US); C. Eugene McMurray, Galion, OH (US)

(73) Assignee: US SYNTHETIC CORPORATION, Orem, UT (US)

( * ) Notice: Subject to any disclaimer, the term of this patent is extended or adjusted under 35 U.S.C. 154(b) by 0 days.

(21) Appl. No.: 14/297,359

(22) Filed: Jun. 5, 2014

Related U.S. Application Data

(63) Continuation of application No. 13/323,138, filed on Dec. 12, 2011, now Pat. No. 8,911,521, which is a continuation-in-part of application No. 12/394,356, filed on Feb. 27, 2009, now Pat. No. 8,080,071.

(60) Provisional application No. 61/068,120, filed on Mar. 3, 2008.

(51) Int. Cl.
*B24D 3/00* (2006.01)
*B24D 3/02* (2006.01)
*B24D 11/00* (2006.01)
*B24D 18/00* (2006.01)
*C09K 3/14* (2006.01)
*E21B 10/567* (2006.01)

(52) U.S. Cl.
CPC .......... *B24D 18/0009* (2013.01); *E21B 10/567* (2013.01)

(58) Field of Classification Search
USPC .......................................... 51/293, 307, 308
See application file for complete search history.

(56) References Cited

U.S. PATENT DOCUMENTS

| | | | |
|---|---|---|---|
| 2,349,577 | A | 5/1944 | Dean |
| 3,745,623 | A | 7/1973 | Wentorf, Jr. et al. |
| 3,918,219 | A | 11/1975 | Wentorf, Jr. et al. |
| 4,009,027 | A | 2/1977 | Naidich et al. |
| 4,016,736 | A | 4/1977 | Carrison et al. |
| 4,063,909 | A | 12/1977 | Mitchell |
| 4,084,942 | A | 4/1978 | Villalobos |
| 4,191,735 | A | 3/1980 | Nelson et al. |
| 4,224,380 | A | 9/1980 | Bovenkerk et al. |

(Continued)

FOREIGN PATENT DOCUMENTS

| | | |
|---|---|---|
| EP | 0 297 071 | 12/1988 |
| EP | 0 352 811 | 1/1990 |

(Continued)

OTHER PUBLICATIONS

U.S. Appl. No. 14/570,506, filed Dec. 15, 2014, Miess et al.

(Continued)

*Primary Examiner* — James McDonough
(74) *Attorney, Agent, or Firm* — Dorsey & Whitney LLP

(57) ABSTRACT

Embodiments of the invention relate to methods of fabricating a polycrystalline diamond compacts and applications for such polycrystalline diamond compacts. In an embodiment, a method of fabricating a polycrystalline diamond compact includes at least saturating a sintering aid material with non-diamond carbon to form a carbon-saturated sintering aid material and sintering a plurality of diamond particles in the presence of the carbon-saturated sintering aid particles to form a polycrystalline diamond table.

20 Claims, 12 Drawing Sheets

(56) References Cited

U.S. PATENT DOCUMENTS

| | | | |
|---|---|---|---|
| 4,268,276 A | 5/1981 | Bovenkerk | |
| 4,274,900 A | 6/1981 | Mueller et al. | |
| 4,333,902 A | 6/1982 | Hara | |
| 4,410,054 A | 10/1983 | Nagel et al. | |
| 4,440,573 A | 4/1984 | Ishizuka | |
| 4,460,382 A | 7/1984 | Ohno | |
| 4,468,138 A | 8/1984 | Nagel | |
| 4,560,014 A | 12/1985 | Geczy | |
| 4,676,124 A | 6/1987 | Fischer | |
| 4,692,418 A * | 9/1987 | Boecker | C04B 35/565 423/345 |
| 4,738,322 A | 4/1988 | Hall et al. | |
| 4,766,027 A | 8/1988 | Burn et al. | |
| 4,778,486 A | 10/1988 | Csillag et al. | |
| 4,783,245 A | 11/1988 | Nakamura et al. | |
| 4,797,326 A | 1/1989 | Csillag | |
| 4,811,801 A | 3/1989 | Salesky et al. | |
| 4,871,377 A | 10/1989 | Frushour | |
| 4,913,247 A | 4/1990 | Jones | |
| 4,940,180 A | 7/1990 | Martell | |
| 4,985,051 A | 1/1991 | Ringwood | |
| 4,992,082 A | 2/1991 | Drawl et al. | |
| 5,011,514 A | 4/1991 | Cho et al. | |
| 5,016,718 A | 5/1991 | Tandberg | |
| 5,032,147 A | 7/1991 | Frushour | |
| 5,049,164 A | 9/1991 | Horton et al. | |
| 5,092,687 A | 3/1992 | Hall | |
| 5,120,327 A | 6/1992 | Dennis | |
| 5,127,923 A | 7/1992 | Bunting et al. | |
| 5,135,061 A | 8/1992 | Newton, Jr. | |
| 5,151,107 A | 9/1992 | Cho et al. | |
| 5,154,245 A | 10/1992 | Waldenstrom et al. | |
| 5,173,091 A | 12/1992 | Marek | |
| 5,180,022 A | 1/1993 | Brady | |
| 5,217,154 A | 6/1993 | Elwood et al. | |
| 5,326,380 A | 7/1994 | Yao et al. | |
| 5,348,109 A | 9/1994 | Griffin et al. | |
| 5,355,969 A | 10/1994 | Hardy et al. | |
| 5,364,192 A | 11/1994 | Damm et al. | |
| 5,368,398 A | 11/1994 | Damm et al. | |
| 5,460,233 A | 10/1995 | Meany et al. | |
| 5,480,233 A | 1/1996 | Cunningham | |
| 5,544,713 A | 8/1996 | Dennis | |
| 5,617,997 A | 4/1997 | Kobayashi et al. | |
| 5,645,617 A | 7/1997 | Frushour | |
| 5,660,075 A | 8/1997 | Johnson et al. | |
| 5,876,859 A | 3/1999 | Saxelby, Jr. et al. | |
| 5,976,707 A | 11/1999 | Grab | |
| 6,054,693 A | 4/2000 | Barmatz et al. | |
| 6,165,616 A | 12/2000 | Lemelson et al. | |
| 6,209,429 B1 | 4/2001 | Urso, III et al. | |
| 6,220,375 B1 | 4/2001 | Butcher et al. | |
| 6,302,225 B1 | 10/2001 | Yoshida et al. | |
| 6,338,754 B1 | 1/2002 | Cannon et al. | |
| 6,344,149 B1 | 2/2002 | Oles | |
| 6,390,181 B1 | 5/2002 | Hall et al. | |
| 6,410,085 B1 | 6/2002 | Griffin et al. | |
| 6,435,058 B1 | 8/2002 | Matthias et al. | |
| 6,481,511 B2 | 11/2002 | Matthias et al. | |
| 6,544,308 B2 | 4/2003 | Griffin et al. | |
| 6,562,462 B2 | 5/2003 | Griffin et al. | |
| 6,585,064 B2 | 7/2003 | Griffin et al. | |
| 6,589,640 B2 | 7/2003 | Griffin et al. | |
| 6,592,985 B2 | 7/2003 | Griffin et al. | |
| 6,601,662 B2 | 8/2003 | Matthias et al. | |
| 6,739,214 B2 | 5/2004 | Griffin et al. | |
| 6,749,033 B2 | 6/2004 | Griffin et al. | |
| 6,793,681 B1 | 9/2004 | Pope et al. | |
| 6,797,326 B2 | 9/2004 | Griffin et al. | |
| 6,861,098 B2 | 3/2005 | Griffin et al. | |
| 6,861,137 B2 | 3/2005 | Griffin et al. | |
| 6,878,447 B2 | 4/2005 | Griffin et al. | |
| 6,892,836 B1 | 5/2005 | Eyre et al. | |
| 7,060,641 B2 | 6/2006 | Qian et al. | |
| 7,377,341 B2 | 5/2008 | Middlemiss et al. | |
| 7,384,821 B2 | 6/2008 | Sung | |
| 7,473,287 B2 | 1/2009 | Belnap et al. | |
| 7,516,804 B2 | 4/2009 | Vail | |
| 7,552,782 B1 | 6/2009 | Sexton et al. | |
| 7,559,695 B2 | 7/2009 | Sexton et al. | |
| 7,569,176 B2 | 8/2009 | Pope et al. | |
| 7,608,333 B2 | 10/2009 | Eyre et al. | |
| 7,635,035 B1 | 12/2009 | Bertagnolli et al. | |
| 7,647,993 B2 | 1/2010 | Middlemiss | |
| 7,694,757 B2 | 4/2010 | Keshavan et al. | |
| 7,726,421 B2 | 6/2010 | Middlemiss | |
| 7,740,673 B2 | 6/2010 | Eyre et al. | |
| 7,753,143 B1 | 7/2010 | Miess et al. | |
| 7,754,333 B2 | 7/2010 | Eyre et al. | |
| 7,828,088 B2 | 11/2010 | Middlemiss et al. | |
| 7,841,428 B2 | 11/2010 | Bertagnolli | |
| 7,845,438 B1 | 12/2010 | Vail et al. | |
| 7,866,418 B2 | 1/2011 | Bertagnolli et al. | |
| 7,942,219 B2 | 5/2011 | Keshavan et al. | |
| 7,980,334 B2 | 7/2011 | Voronin et al. | |
| 8,002,859 B2 | 8/2011 | Griffo et al. | |
| 8,028,771 B2 | 10/2011 | Keshavan et al. | |
| 8,034,136 B2 | 10/2011 | Sani | |
| 8,056,650 B2 | 11/2011 | Middlemiss | |
| 8,066,087 B2 | 11/2011 | Griffo et al. | |
| 8,069,937 B2 | 12/2011 | Mukhopadhyay | |
| 8,071,173 B1 | 12/2011 | Sani | |
| 8,080,071 B1 | 12/2011 | Vail et al. | |
| 8,080,074 B2 | 12/2011 | Sani | |
| 8,147,572 B2 | 4/2012 | Eyre et al. | |
| 8,202,335 B2 | 6/2012 | Cooley et al. | |
| 8,236,074 B1 | 8/2012 | Bertagnolli | |
| 8,297,382 B2 | 10/2012 | Bertagnolli et al. | |
| 8,323,367 B1 | 12/2012 | Bertagnolli | |
| 8,328,891 B2 | 12/2012 | Zhang et al. | |
| 8,353,371 B2 | 1/2013 | Cooley et al. | |
| 8,415,033 B2 | 4/2013 | Matsuzawa et al. | |
| 8,529,649 B2 | 9/2013 | Sani | |
| 8,616,306 B2 | 12/2013 | Bertagnolli et al. | |
| 2001/0040053 A1 | 11/2001 | Beuershausen | |
| 2003/0019333 A1 | 1/2003 | Scott | |
| 2004/0111159 A1 | 6/2004 | Pope et al. | |
| 2004/0155096 A1 | 8/2004 | Zimmerman et al. | |
| 2005/0044800 A1 | 3/2005 | Hall et al. | |
| 2005/0050801 A1 | 3/2005 | Cho et al. | |
| 2005/0117984 A1 | 6/2005 | Eason | |
| 2005/0210755 A1 | 9/2005 | Cho et al. | |
| 2006/0060392 A1 | 3/2006 | Eyre | |
| 2006/0266558 A1 | 11/2006 | Middlemiss et al. | |
| 2007/0056778 A1 | 3/2007 | Webb et al. | |
| 2007/0079994 A1 | 4/2007 | Middlemiss | |
| 2007/0187155 A1 | 8/2007 | Middlemiss | |
| 2008/0206576 A1 | 8/2008 | Qian et al. | |
| 2008/0223575 A1 | 9/2008 | Oldham et al. | |
| 2008/0223621 A1 | 9/2008 | Middlemiss et al. | |
| 2008/0223623 A1 | 9/2008 | Keshavan et al. | |
| 2008/0230279 A1 | 9/2008 | Bitler et al. | |
| 2008/0230280 A1 | 9/2008 | Keshavan et al. | |
| 2008/0247899 A1 * | 10/2008 | Cho | B22F 5/08 419/10 |
| 2009/0120009 A1 * | 5/2009 | Sung | C09K 3/1409 51/295 |
| 2009/0152015 A1 | 6/2009 | Sani et al. | |
| 2009/0166094 A1 | 7/2009 | Keshavan et al. | |
| 2009/0173015 A1 | 7/2009 | Keshavan et al. | |
| 2009/0173547 A1 | 7/2009 | Voronin et al. | |
| 2009/0313908 A1 | 12/2009 | Zhang et al. | |
| 2010/0012389 A1 | 1/2010 | Zhang et al. | |
| 2010/0038148 A1 | 2/2010 | King | |
| 2010/0095602 A1 | 4/2010 | Belnap et al. | |
| 2010/0104874 A1 | 4/2010 | Yong et al. | |
| 2010/0122852 A1 | 5/2010 | Russell et al. | |
| 2010/0155149 A1 | 6/2010 | Keshavan et al. | |
| 2010/0181117 A1 | 7/2010 | Scott | |
| 2010/0186303 A1 | 7/2010 | Ras et al. | |
| 2010/0212971 A1 | 8/2010 | Mukhopadhyay | |
| 2010/0236836 A1 | 9/2010 | Voronin | |
| 2010/0243336 A1 | 9/2010 | Dourfaye et al. | |
| 2010/0281782 A1 | 11/2010 | Keshavan et al. | |

(56) References Cited

U.S. PATENT DOCUMENTS

| | | | |
|---|---|---|---|
| 2010/0287845 A1 | 11/2010 | Montross et al. | |
| 2010/0294571 A1 | 11/2010 | Belnap et al. | |
| 2011/0023375 A1 | 2/2011 | Sani et al. | |
| 2011/0031031 A1 | 2/2011 | Vemptai et al. | |
| 2011/0036643 A1 | 2/2011 | Belnap et al. | |
| 2011/0042149 A1 | 2/2011 | Scott et al. | |
| 2011/0056753 A1 | 3/2011 | Middlemiss et al. | |
| 2011/0067929 A1 | 3/2011 | Mukhopadhyay et al. | |
| 2011/0083908 A1 | 4/2011 | Shen et al. | |
| 2011/0120782 A1 | 5/2011 | Cooley et al. | |
| 2011/0259648 A1 | 10/2011 | Sani | |
| 2011/0284294 A1 | 11/2011 | Cox et al. | |
| 2012/0037429 A1* | 2/2012 | Davies | B22F 1/025 175/428 |
| 2012/0047815 A1 | 3/2012 | Sani | |
| 2012/0103701 A1* | 5/2012 | Cho | B23B 51/02 175/428 |
| 2012/0138370 A1 | 6/2012 | Mukhopadhyay et al. | |
| 2012/0228037 A1 | 9/2012 | Cooley et al. | |
| 2012/0241224 A1 | 9/2012 | Qian et al. | |
| 2013/0205677 A1 | 8/2013 | Bertagnolli et al. | |
| 2013/0291443 A1* | 11/2013 | Naidoo | B01J 3/062 51/307 |
| 2013/0313027 A1 | 11/2013 | Sani | |
| 2014/0223835 A1 | 8/2014 | Thigpen et al. | |
| 2014/0283457 A1 | 9/2014 | Cariveau et al. | |
| 2015/0114726 A1 | 4/2015 | Shen et al. | |

FOREIGN PATENT DOCUMENTS

| | | |
|---|---|---|
| EP | 0 374 424 | 6/1990 |
| EP | 0 699 642 | 3/1996 |
| GB | 2300424 | 11/1996 |
| GB | 2 461 198 | 12/2009 |
| WO | WO 2008/063568 | 5/2008 |
| WO | WO 2010/039346 | 4/2010 |
| WO | WO 2010/098978 | 9/2010 |
| WO | WO 2010/100629 | 9/2010 |
| WO | WO 2010/100630 | 9/2010 |

OTHER PUBLICATIONS

U.S. Appl. No. 14/614,332, filed Feb. 8, 2015, Bertagnolli et al.
U.S. Appl. No. 14/621,019, filed Feb. 12, 2015, Jones et al.
U.S. Appl. No. 14/633,041, filed Feb. 26, 2015, Miess et al.
U.S. Appl. No. 14/634,395, filed Feb. 27, 2015, Miess et al.
U.S. Appl. No. 14/661,933, filed Mar. 18, 2015, Sani.
ASTM B887-03 (2008) "Standard Test Method for Determination of Coercivity (Hcs) of Cemented Carbides".
ASTM B886-03 (2008), "Standard Test Method for Determination of Magnetic Saturation (Ms) of Cemented Carbides".
U.S. Appl. No. 13/100,388, Nov. 7, 2014, Notice of Allowance.
U.S. Appl. No. 13/100,388, Dec. 24, 2014, Notice of Allowance.
U.S. Appl. No. 13/100,388, Mar. 4, 2015, Notice of Allowance.
U.S. Appl. No. 13/100,388, Apr. 13, 2015, Notice of Allowance.
U.S. Appl. No. 13/100,388, Apr. 22, 2015, Issue Notification.
U.S. Appl. No. 13/292,491, Nov. 3, 2014, Office Action.
U.S. Appl. No. 13/292,491, Dec. 19, 2014, Notice of Allowance.
U.S. Appl. No. 13/292,491, Apr. 15, 2015, Issue Notification.
U.S. Appl. No. 13/027,954, Dec. 26, 2014, Notice of Allowance.
U.S. Appl. No. 13/027,954, Apr. 8, 2015, Issue Notification.
U.S. Appl. No. 12/961,787, May 21, 2015, Office Action.
U.S. Appl. No. 13/323,138, Nov. 25, 2014, Issue Notification.
U.S. Appl. No. 13/397,971, Nov. 26, 2014, Notice of Allowance.
U.S. Appl. No. 13/397,971, Mar. 19, 2015, Issue Notification.
U.S. Appl. No. 13/953,453, Feb. 12, 2015, Notice of Allowance.
U.S. Appl. No. 13/953,453, Feb. 25, 2015, Issue Notification.
U.S. Appl. No. 60/850,969, filed Oct. 10, 2006, Cooley, et al.
U.S. Appl. No. 60/860,098, filed Nov. 20, 2006, Sani.
U.S. Appl. No. 60/876,701, filed Dec. 21, 2006, Sani.
U.S. Appl. No. 61/068,120, filed Mar. 3, 2008, Vail.
U.S. Appl. No. 12/548,584, filed Aug. 27, 2009, Bertagnolli.
U.S. Appl. No. 13/027,954, filed Feb. 15, 2011, Miess et al.
U.S. Appl. No. 13/100,388, filed May 4, 2011, Jones et al.
U.S. Appl. No. 13/171,735, filed Jun. 29, 2011, Bertagnolli.
U.S. Appl. No. 13/285,198, filed Oct. 31, 2011, Sani.
U.S. Appl. No. 13/292,900, filed Nov. 9, 2011, Vail.
U.S. Appl. No. 13/323,138, filed Dec. 12, 2011, Miess et al.
U.S. Appl. No. 13/690,397, filed Nov. 30, 2012, Miess et al.
U.S. Appl. No. 13/397,971, filed Feb. 16, 2012, Miess et al.
U.S. Appl. No. 14/067,831, filed Oct. 30, 2013, Bertagnolli et al.
U.S. Appl. No. 14/178,118, filed Feb. 11, 2014, Mukhopadhyay et al.
U.S. Appl. No. 14/264,932, filed Apr. 29, 2014, Vail.
Akaishi, Minoru, "Synthesis of polycrystalline diamond compact with magnesium carbonate and its physical properties," Diamond and Related Materials, 1996 (pp. 2-7).
Decker, et al., "High-Pressure Calibration: A Critical Review," J. Phys. Chem. Ref. Data, 1, 3 (1972).
Declaration of Prior Sales of Terracut PDCS executed by Kenneth E. Bertagnolli Feb. 3, 2011.
Declaration of Prior Sales of Terracut PDCS executed by Paul D. Jones Feb. 3, 2011.
Ekimov, E.A., et al. "Mechanical Properties and Microstructure of Diamond-SiC Nanocomposites" Inorganic Materials, vol. 38, No. 11, 2002, pp. 1117-1122.
Glowka, D.A. & Stone, C.M., "Effects of Termal and Mechanical Loading on PDC Bit Life", SPE Drilling Engineering, Jun. 1986 (pp. 201-214).
Hosomi, Satoru, et al., "Diamond Formation by a Solid State Reaction", Science and Technology of New Diamond, pp. 239-243 (1990).
Hsueh, C.H. & Evans, A.G., "Residual Stresses in Metal/Ceramic Bonded Strips", J. Am. Ceram. Soc., 68 [5] (1985) pp. 241-248.
International Search Report and Written Opinion for PCT International Application No. PCT/US2007/024090; Apr. 15, 2008.
International Search Report and Written Opinion from International Application No. PCT/US2011/060380 dated Mar. 12, 2012.
Ledbetter, H.M., et al. "Elastic Properties of Metals and Alloys. II. Copper", Journal of Physics and Chemical Reference Data, vol. 3, No. 4, 1974. pp. 897-935.
Lin, Tze-Pin; Hood, Michael & Cooper George A., "Residual Stresses in Polycrystalline Diamond Compacts", J. Am. Ceram Soc., 77 [6] (1994) pp. 1562-1568.
Liu, Xueran, et al., "Fabrication of the supersaturated solid solution of carbon in copper by mechanical alloying", Materials Characterization, vol. 58, Issue 8 (Jun. 2007), pp. 504-508.
Orwa, J.O., et al., "Diamond nanocrystals formed by direct implantation of fused silica with carbon," Journal of Applied Physics, vol. 90, No. 6, 2001, pp. 3007-3018.
Radtke, Robert, "Faster Drilling, Longer Life: Thermally Stable Diamond Drill Bit Cutters," Drilling Systems, Summer 2004 (pp. 5-9).
Rousse, et al. "Structure of the Intermediate Phase of PbTe at High Pressure," Physical Review B: Condensed Matter and Materials Physics, 71, 224116 (2005).
Saji, S., et al., Solid Solubility of Carbon in Copper during Mechanical Alloying, Materials Transactions, vol. 39, No. 7 (1998), pp. 778-781.
Suryanarayana, C., "Novel Methods of BRAZING Dissimilar Materials," Advanced Materials & Processes, Mar. 2001 (3 pgs).
Tanaka, T., et al., "Formation of Metastable Phases of Ni-C and Co-C Systems by Mechanical Alloying", Metallurgical Transactions, vol. 23A, Sep. 1992, pp. 2431-2435.
Timoshenko, S.P. & Goodler, J.N., "Theory of Elasticity", McGraw-Hill Classic Textbook Reissue 1934, pp. 8-11, 456-458.
Tomlinson, P.N. et al. "Syndax3 Pins-New Concepts in PCD Drilling," Rock Drilling, IDR Mar. 1992, 1992 (pp. 109-114).
Ueda, Fumihiro, "Cutting performance of sintered diamond with MgCO3 as a sintering agent," Materials Science and Engineering, 1996 (pp. 260-263).
Yamane, T., et al., "Solid solubility of carbon in copper mechanically alloyed", Journal of Materials Science Letters 20 (2001), pp. 259-260.
U.S. Appl. No. 11/983,619, May 26, 2010, Office Action.
U.S. Appl. No. 11/545,929, Aug. 13, 2008, Office Action.
U.S. Appl. No. 11/545,929, Jan. 21, 2009, Office Action.

(56) References Cited

OTHER PUBLICATIONS

U.S. Appl. No. 11/545,929, Aug. 27, 2009, Office Action.
U.S. Appl. No. 11/545,929, Apr. 15, 2010, Office Action.
U.S. Appl. No. 11/545,929, Jul. 21, 2010, Office Action.
U.S. Appl. No. 11/545,929, Mar. 20, 2012, Notice of Allowance.
U.S. Appl. No. 11/545,929, Jul. 18, 2012, Issue Notification.
U.S. Appl. No. 11/983,619, Aug. 9, 2010, Office Action.
U.S. Appl. No. 11/983,619, Mar. 28, 2011, Office Action.
U.S. Appl. No. 11/983,619, Jun. 16, 2011, Notice of Allowance.
U.S. Appl. No. 11/983,619, Sep. 21, 2011, Issue Notification.
U.S. Appl. No. 12/271,081, Dec. 22, 2010, Office Action.
U.S. Appl. No. 12/271,081, Mar. 31, 2011, Office Action.
U.S. Appl. No. 12/271,081, Aug. 8, 2011, Office Action.
U.S. Appl. No. 12/271,081, Oct. 5, 2011, Notice of Allowance.
U.S. Appl. No. 12/363,104, Oct. 14, 2010, Office Action.
U.S. Appl. No. 12/363,104, Apr. 12, 2011, Office Action.
U.S. Appl. No. 12/363,104, Aug. 25, 2011, Notice of Allowance.
U.S. Appl. No. 12/394,356, Sep. 1, 2011, Notice of Allowance.
U.S. Appl. No. 12/394,356, Nov. 30, 2011, Issue Notification.
U.S. Appl. No. 12/397,969, May 25, 2012, Notice of Allowance.
U.S. Appl. No. 12/397,969, Nov. 14, 2012, Issue Notification.
U.S. Appl. No. 12/548,584, May 18, 2012, Office Action.
U.S. Appl. No. 12/548,584, Oct. 24, 2012, Office Action.
U.S. Appl. No. 12/548,584, Jan. 3, 2013, Office Action.
U.S. Appl. No. 12/548,584, Jun. 14, 2013, Office Action.
U.S. Appl. No. 12/548,584, Sep. 26, 2013, Office Action.
U.S. Appl. No. 12/548,584, Mar. 6, 2014, Notice of Allowance.
U.S. Appl. No. 13/032,350, Nov. 26, 2012, Office Action.
U.S. Appl. No. 13/032,350, Mar. 14, 2013, Office Action.
U.S. Appl. No. 13/032,350, Sep. 30, 2013, Office Action.
U.S. Appl. No. 13/032,350, Apr. 15, 2014, Notice of Allowance.
U.S. Appl. No. 13/100,388, Oct. 18, 2013, Office Action.
U.S. Appl. No. 13/100,388, Jan. 15, 2014, Office Action.
U.S. Appl. No. 13/171,735, Aug. 17, 2012, Office Action.
U.S. Appl. No. 13/171,735, Jan. 24, 2013, Office Action.
U.S. Appl. No. 13/171,735, Jul. 12, 2013, Office Action.
U.S. Appl. No. 13/171,735, Jan. 10, 2014, Office Action.
U.S. Appl. No. 13/171,735, May 7, 2014, Notice of Allowance.
U.S. Appl. No. 13/230,125, May 23, 2012, Office Action.
U.S. Appl. No. 13/230,125, Jul. 11, 2012, Office Action.
U.S. Appl. No. 13/230,125, Jan. 18, 2013, Office Action.
U.S. Appl. No. 13/230,125, May 1, 2013, Notice of Allowance.
U.S. Appl. No. 13/230,125, Aug. 21, 2013, Issue Notification.
U.S. Appl. No. 13/285,198, Apr. 3, 2012, Office Action.
U.S. Appl. No. 13/285,198, Jul. 11, 2012, Office Action.
U.S. Appl. No. 13/285,198, Feb. 5, 2013, Notice of Allowance.
U.S. Appl. No. 13/285,198, Jul. 22, 2013, Notice of Allowance.
U.S. Appl. No. 13/285,198, Nov. 22, 2013, Notice of Allowance.
U.S. Appl. No. 13/285,198, Apr. 11, 2014, Notice of Allowance.
U.S. Appl. No. 13/292,491, Aug. 8, 2012, Office Action.
U.S. Appl. No. 13/292,491, Feb. 11, 2013, Office Action.
U.S. Appl. No. 13/292,491, Jul. 18, 2013, Office Action.
U.S. Appl. No. 13/292,491, Oct. 29, 2013, Office Action.
U.S. Appl. No. 13/292,491, Mar. 21, 2014, Office Action.
U.S. Appl. No. 13/027,954, Jul. 18, 2013, Office Action.
U.S. Appl. No. 13/027,954, Nov. 13, 2013, Office Action.
U.S. Appl. No. 13/027,954, Mar. 10, 2014, Office Action.
U.S. Appl. No. 13/027,954, Jun. 3, 2014, Notice of Allowance.
U.S. Appl. No. 13/690,397, Feb. 14, 2013, Office Action.
U.S. Appl. No. 13/690,397, May 29, 2013, Notice of Allowance.
U.S. Appl. No. 13/690,397, Aug. 9, 2013, Office Action.
U.S. Appl. No. 13/690,397, Nov. 25, 2013, Office Action.
U.S. Appl. No. 13/690,397, Mar. 12, 2014, Notice of Allowance.
U.S. Appl. No. 13/917,952, Jul. 31, 2013, Office Action.
U.S. Appl. No. 13/917,952, Nov. 13, 2013, Office Action.
U.S. Appl. No. 13/917,952, Feb. 26, 2014, Notice of Allowance.
U.S. Appl. No. 13/292,900, May 23, 2013, Office Action.
U.S. Appl. No. 13/292,900, Oct. 22, 2013, Notice of Allowance.
U.S. Appl. No. 13/292,900, Nov. 25, 2013, Notice of Allowance.
U.S. Appl. No. 13/292,900, Jan. 30, 2014, Notice of Allowance.
U.S. Appl. No. 13/292,900, May 28, 2014, Issue Notification.
U.S. Appl. No. 12/961,787, May 29, 2013, Office Action.
U.S. Appl. No. 12/961,787, Aug. 30, 2013, Office Action.
U.S. Appl. No. 12/961,787, Apr. 11, 2014, Office Action.
U.S. Appl. No. 13/323,138, Oct. 1, 2013, Office Action.
U.S. Appl. No. 13/323,138, Nov. 29, 2013, Notice of Allowance.
U.S. Appl. No. 13/323,138, Mar. 12, 2014, Notice of Allowance.
U.S. Appl. No. 13/953,453, Sep. 19, 2013, Office Action.
U.S. Appl. No. 13/953,453, Oct. 10, 2013, Office Action.
U.S. Appl. No. 13/953,453, Mar. 18, 2014, Office Action.
U.S. Appl. No. 13/100,388, Jun. 17, 2014, Notice of Allowance.
U.S. Appl. No. 13/917,952, Jun. 11, 2014, Issue Notification.
U.S. Appl. No. 13/397,971, Jun. 19, 2014, Office Action.
U.S. Appl. No. 14/327,264, filed Jul. 9, 2014, Sani.
U.S. Appl. No. 14/330,851, filed Jul. 14, 2014, Sani.
U.S. Appl. No. 12/548,584, Jun. 25, 2014, Issue Notification.
U.S. Appl. No. 13/032,350, Aug. 13, 2014, Issue Notification.
U.S. Appl. No. 13/100,388, Aug. 4, 2014, Notice of Allowance.
U.S. Appl. No. 13/285,198, Jul. 30, 2014, Issue Notification.
U.S. Appl. No. 13/292,491, Aug. 8, 2014, Office Action.
U.S. Appl. No. 13/690,397, Jul. 9, 2014, Issue Notification.
U.S. Appl. No. 13/323,138, Jul. 29, 2014, Notice of Allowance.
U.S. Appl. No. 13/953,453, Jun. 24, 2014, Notice of Allowance.
U.S. Appl. No. 14/495,759, filed Sep. 24, 2014, Sani.
U.S. Appl. No. 14/504,253, filed Oct. 1, 2014, Bertagnolli et al.
U.S. Appl. No. 13/027,954, Sep. 12, 2014, Notice of Allowance.
U.S. Appl. No. 14/512,007, filed Oct. 10, 2014, Bertagnolli et al.
U.S. Appl. No. 13/171,735, Aug. 6, 2014, Issue Notification.
U.S. Appl. No. 12/961,787, Dec. 3, 2015, Office Action.
U.S. Appl. No. 14/178,118, Sep. 10, 2015, Office Action.
U.S. Appl. No. 14/178,118, Jan. 22, 2016, Office Action.
U.S. Appl. No. 14/570,506, Sep. 15, 2015, Office Action.
U.S. Appl. No. 14/067,831, Jul. 15, 2015, Office Action.
U.S. Appl. No. 14/067,831, Oct. 26, 2015, Office Action.
U.S. Appl. No. 14/327,264, Nov. 6, 2015, Office Action.
U.S. Appl. No. 14/330,851, Nov. 12, 2015, Office Action.
U.S. Appl. No. 14/495,759, Jan. 20, 2016, Office Action.

* cited by examiner

METHODS OF FABRICATING POLYCRYSTALLINE DIAMOND COMPACTS

CROSS-REFERENCE TO RELATED APPLICATIONS

This application is a continuation of U.S. application Ser. No. 13/323,138 filed on 12 Dec. 2011, which is a continuation-in-part of U.S. application Ser. No. 12/394,356 filed on 27 Feb. 2009 (now U.S. Pat. No. 8,080,071 issued on 20 Dec. 2011), which claims the benefit of U.S. Provisional Application No. 61/068,120 filed on 3 Mar. 2008, the contents of each of the foregoing applications are incorporated herein, in their entirety, by this reference.

BACKGROUND

Wear-resistant, polycrystalline diamond compacts ("PDCs") are utilized in a variety of mechanical applications. For example, PDCs are used in drilling tools (e.g., cutting elements, gage trimmers, etc.), machining equipment, bearing apparatuses, wire-drawing machinery, and in other mechanical apparatuses.

PDCs have found particular utility as superabrasive cutting elements in rotary drill bits, such as roller-cone drill bits and fixed-cutter drill bits. A PDC cutting element typically includes a superabrasive diamond layer commonly known as a diamond table. The diamond table is formed and bonded to a substrate using a high-pressure/high-temperature ("HPHT") process. The PDC cutting element may be brazed directly into a preformed pocket, socket, or other receptacle formed in a bit body. The substrate may often be brazed or otherwise joined to an attachment member, such as a cylindrical backing. A rotary drill bit typically includes a number of PDC cutting elements affixed to the bit body. It is also known that a stud carrying the PDC may be used as a PDC cutting element when mounted to a bit body of a rotary drill bit by press-fitting, brazing, or otherwise securing the stud into a receptacle formed in the bit body.

Conventional PDCs are normally fabricated by placing a cemented-carbide substrate into a container with a volume of diamond particles positioned on a surface of the cemented-carbide substrate. A number of such containers may be loaded into an HPHT press. The substrate(s) and volume(s) of diamond particles are then processed under HPHT conditions in the presence of a catalyst material that causes the diamond particles to bond to one another to form a matrix of bonded diamond grains defining a polycrystalline diamond ("PCD") table. The catalyst material is often a metal-solvent catalyst (e.g., cobalt, nickel, iron, or alloys thereof) that is used for promoting intergrowth of the diamond particles.

In one conventional approach, a constituent of the cemented-carbide substrate, such as cobalt from a cobalt-cemented tungsten carbide substrate, liquefies and sweeps from a region adjacent to the volume of diamond particles into interstitial regions between the diamond particles during the HPHT process. The cobalt acts as a catalyst to promote intergrowth between the diamond particles, which results in formation of a matrix of bonded diamond grains having diamond-to-diamond bonding therebetween, with interstitial regions between the bonded diamond grains being occupied by the solvent catalyst.

The presence of the solvent catalyst in the PCD table is believed to reduce the thermal stability of the PCD table at elevated temperatures. For example, the difference in thermal expansion coefficient between the diamond grains and the solvent catalyst is believed to lead to chipping or cracking of the PCD table during drilling or cutting operations, which consequently can degrade the mechanical properties of the PCD table or cause failure. Additionally, some of the diamond grains can undergo a chemical breakdown or back-conversion to graphite via interaction with the solvent catalyst. At elevated high temperatures, portions of the diamond grains may transform into carbon monoxide, carbon dioxide, graphite, or combinations thereof, causing degradation of the mechanical properties of the PCD table. One conventional approach for improving the thermal stability of PDCs is to at least partially remove the solvent catalyst from the PCD table of the PDC by acid leaching.

Despite the availability of a number of different PDCs, manufacturers and users of PDCs continue to seek PDCs that exhibit improved wear resistance and thermal stability.

SUMMARY

Embodiments of the invention relate to methods of fabricating PDCs and applications for such PDCs. In an embodiment, a method of fabricating a PDC includes at least saturating a sintering aid material with non-diamond carbon to form a carbon-saturated sintering aid material and sintering a plurality of diamond particles in the presence of the carbon-saturated sintering aid material to form a PCD table.

Other embodiments include PCD elements and PDCs formed by the above-described methods, and applications utilizing such PCD bodies and PDCs in various articles and apparatuses, such as rotary drill bits, bearing apparatuses, wire-drawing dies, machining equipment, and other articles and apparatuses.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments of the invention, wherein identical reference numerals refer to identical elements or features in different views or embodiments shown in the drawings.

DETAILED DESCRIPTION

Embodiments of the invention relate to PDCs comprising a PCD table sintered using a sintering aid material that has been at least saturated with non-diamond carbon and/or infiltrated with an infiltrant that is at least saturated with non-diamond carbon. HPHT sintering diamond particles in the presence of a sintering aid that has been at least saturated and, in some cases, supersaturated with non-diamond carbon may promote diamond growth during HPHT sintering and may result in improved thermal stability and/or wear resistance of the PCD so formed. The disclosed PDCs herein may be used in a variety of applications, such as rotary drill bits, mining tools, drill bits, bearing apparatuses, wire-drawing dies, machining equipment, and other articles and apparatuses.

Figure 1A:
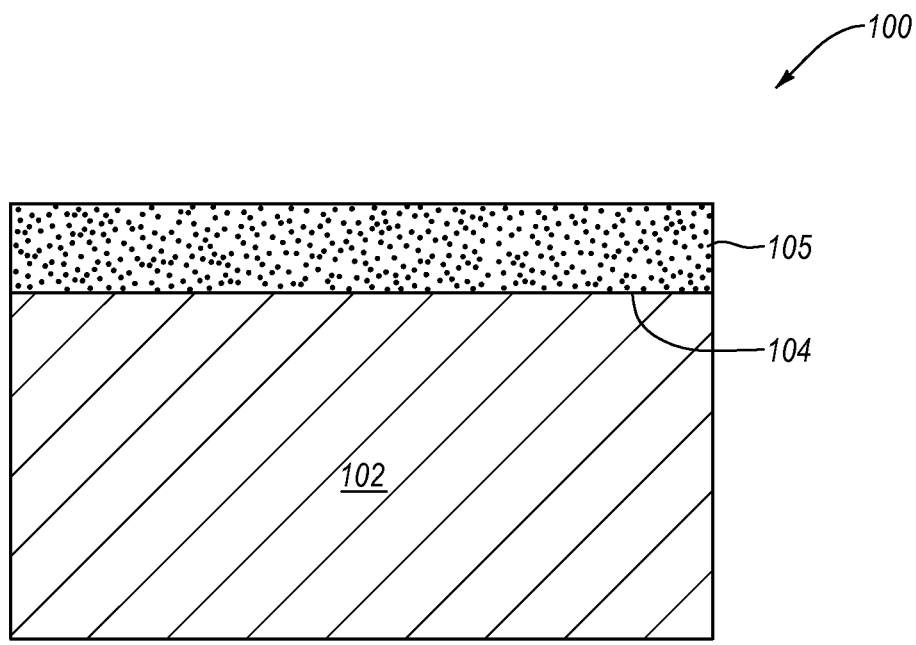
FIG. 1A is a cross-sectional view of an embodiment of a PDC precursor assembly including a mixture comprising a plurality of sintering aid particles at least saturated with carbon and a plurality of diamond particles positioned adjacent to a substrate.
Figure 1B:
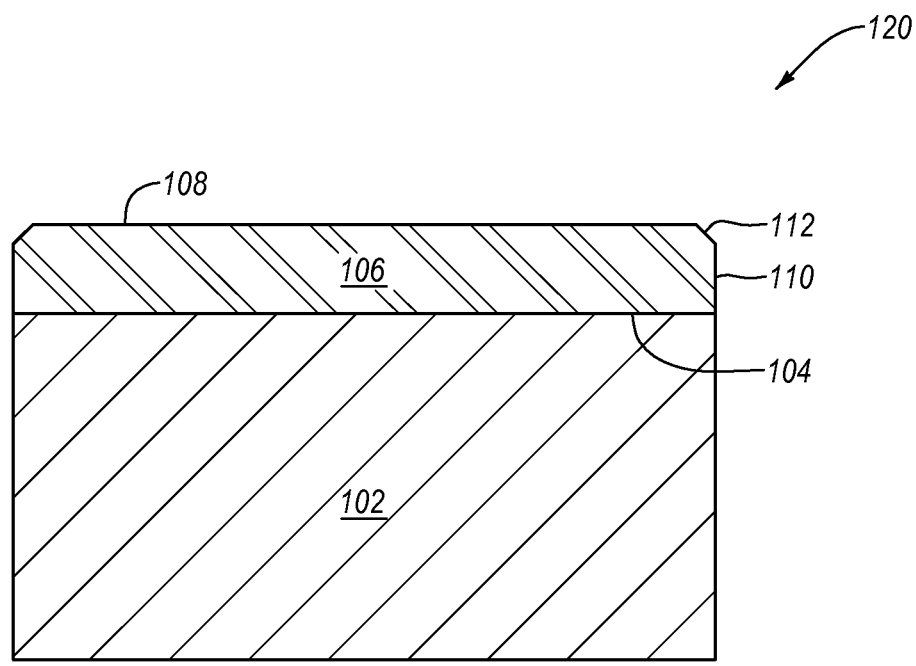
FIG. 1B is a cross-sectional view of a PDC formed by HPHT processing of the PDC precursor assembly shown in FIG. 1A.

FIG. 1A is a cross-sectional view of an embodiment of a PDC precursor assembly 100 for forming a PCD body from a mixture 105 comprising a plurality of sintering aid particles at least saturated with carbon (i.e., carbon-saturated sintering aid particles) and a plurality of diamond particles. Such an assembly 100 may be HPHT processed to form a PCD table 106 (FIG. 1B) integrally formed with and bonded to a substrate 102 (FIG. 1B). The plurality of sintering aid particles that are at least saturated with non-diamond carbon may sometimes be referred to herein in the different embodiments as carbon-saturated sintering aid particles and may be saturated or supersaturated with carbon at standard temperature and pressure (i.e., 0° C. and 1 atmosphere). For example, when the sintering aid particles are saturated with non-diamond carbon, they may include carbon at about the solubility limit for carbon in the particular sintering aid material at standard temperature and pressure (i.e., 0° C. and 1 atmosphere). As another example, when the sintering aid particles are supersaturated with non-diamond carbon, they may include carbon in excess of the solubility limit for carbon in the particular sintering aid material at standard temperature and pressure (i.e., 0° C. and 1 atmosphere or above). As used herein, the phrases "at least saturated with carbon," "saturated with carbon," and variants thereof include materials that are supersaturated with carbon and materials that are saturated with carbon. For example, the carbon supersaturated in the sintering aid material may have a concentration of about 5 atomic % to about 30 atomic %, such as about 10 atomic % to about 20 atomic %, about 20 atomic % to about 30 atomic %, or about 18 atomic % to about 25 atomic %.

According to one or more embodiments, the carbon-saturated sintering aid particles may be formed by mechanically milling sintering aid particles with a non-diamond carbon to mechanically alloy the sintering aid particles with non-diamond carbon. For example, the non-diamond carbon may be selected from amorphous carbon, lamp black carbon, graphite particles (e.g., carbon-12 graphite particles, carbon-graphite particles, or mixtures thereof), graphene, nanotubes, fullerenes, combinations of the foregoing, and the like, while the sintering aid materials from which the sintering aid particles are made may be selected from cobalt, nickel, iron, copper, aluminum, titanium, tungsten, niobium, zirconium, tantalum, boron, silicon, alloys of any of the foregoing materials, any other suitable metal and/or alloy, or combinations of any of the foregoing sintering aid materials. Some of the foregoing metal and alloys may not be carbide formers that will partially consume diamond particles during HPHT sintering, such as copper and copper alloys. Some of the foregoing metal and alloys from which the sintering aid particles may be made are common diamond catalysts (e.g., cobalt, iron, and nickel). However, other ones of the foregoing metals and alloys (e.g., aluminum, copper, titanium, tungsten, boron, silicon, and alloys) from which the sintering aid particles may be made are not typically known as solvent catalysts, but can facilitate diamond sintering when mechanically alloyed with selected amount(s) of non-diamond carbon. Accordingly, a particular sintering aid material may or may not be a diamond catalyst depending on its composition and nature.

Mechanically alloying is a process in which a powder and/or a particulate mixture is subjected to impacts by an impacting medium that cause a multiplicity of deformations, particle weldings, and fracturing until the powder and/or particulate mixture is converted to an essentially uniform particulate product. While attritor mills and horizontal ball mills may be used for mechanical alloying, other types of mechanical milling apparatuses may be used to practice the various embodiments disclosed herein.

The plurality of sintering aid particles and the non-diamond carbon are subjected to mechanical milling (e.g., attritor and/or ball milling) to such an extent that the sintering aid particles are mechanically alloyed with a selected concentration of carbon so that the sintering aid particles become at least saturated with carbon, and in some embodiments, supersaturated with carbon at standard temperature and pressure (i.e., 0° C. and 1 atmosphere) or above. For example, the mechanical milling of the plurality of sintering aid particles and the non-diamond carbon may be performed for about 100 hours to about 1100 hours, such as about 200 hours to about 500 hours or about 150 hours to about 700 hours. In some embodiments, the milling may be carried out up to 2000 hours resulting in the formation of metastable phases of Ni—C, Co—C, Cu—C, Al—C, Fe—C, Ti—C, W—C, B—C, Si—C, among others. For example, in some embodiments, the supersaturated solid solubility of carbon in copper mechanically alloyed with carbon may be as high as 28.5 atomic %. The metallographic structure of these metastable phases may be observed by scanning electron microscopy ("SEM") and transmission electron microscopy ("TEM"). TEM observation of the effects of the milling process may reveal a structural change of the powders subjected to the ball-milling process. For example, in an embodiment, the grain size may be observed to decrease as mechanical alloy processing time is increased.

In other embodiments, identification of the phases and measurement of the lattice constants may be achieved by mechanically slicing samples of the mechanically alloyed particles for analysis by X-ray diffractometry. In an embodiment, such analysis of nickel and non-diamond carbon reveals the formation of a Ni—C supersaturated phase that may be observed with increased milling time. For example, in an embodiment, the non-diamond carbon concentration after approximately 1000 hours of mechanical alloying nickel particles with carbon may be estimated to be about 9 atomic % to about 12 atomic %.

Such carbon-saturated sintering aid materials present within the mixture 105, shown in FIG. 1A, are believed to promote diamond growth between diamond particles during HPHT sintering so that the diamond-to-diamond bond density and/or quality increases. The increased diamond-to-diamond bond density present in the sintered PCD table 106 (FIG. 1B) is believed to increase the wear resistance and/or thermal stability as compared to a sintered PCD table fabricated without using carbon-saturated sintering aid particles.

Referring again to FIG. 1A, the plurality of diamond particles may be mixed with the carbon-saturated sintering aid particles to form the mixture 105. In some embodiments, the carbon-saturated sintering aid particles may partially or substantially completely coat the diamond particles. The plurality of diamond particles of the mixture 105 may exhibit one or more selected sizes. The one or more selected sizes may be determined, for example, by passing the diamond particles through one or more sizing sieves or by any other method. In an embodiment, the plurality of diamond particles may include a relatively larger size and at least one relatively smaller size. As used herein, the phrases "relatively larger" and "relatively smaller" refer to particle sizes determined by any suitable method, which differ by at least a factor of two (e.g., 40 μm and 20 μm). More particularly, in various embodiments, the plurality of diamond particles may include a portion exhibiting a relatively larger size (e.g., 100 μm, 90 μm, 80 μm, 70 μm, 60 μm, 50 μm, 40 μm, 30 μm, 20 μm, 15 μm, 12 μm, 10 μm, 8 μm) and another portion exhibiting at least one relatively smaller size (e.g., 30 μm, 20 μm, 10 μm, 15 μm, 12 μm, 10 μm, 8 μm, 4 μm, 2 μm, 1 μm, 0.5 μm, less than 0.5 μm, 0.1 μm, less than 0.1 μm). In an embodiment, the plurality of diamond particles may include a portion exhibiting a relatively larger size between about 40 μm and about 15 μm and another portion exhibiting a relatively smaller size between about 12 μm and 2 μm. Of course, the plurality of diamond particles may also include three or more different sizes (e.g., one relatively larger size and two or more relatively smaller sizes) without limitation. The sintering aid particles may exhibit any of the particle sizes and distributions discussed above for the diamond particles.

It is noted that the as-sintered diamond grain size of the PCD table 106 in FIG. 1B may differ from the average particle size of the plurality of diamond particles prior to sintering due to a variety of different physical processes, such as grain growth, diamond particles fracturing, carbon provided from another carbon source, or combinations of the foregoing.

Figure 1C:
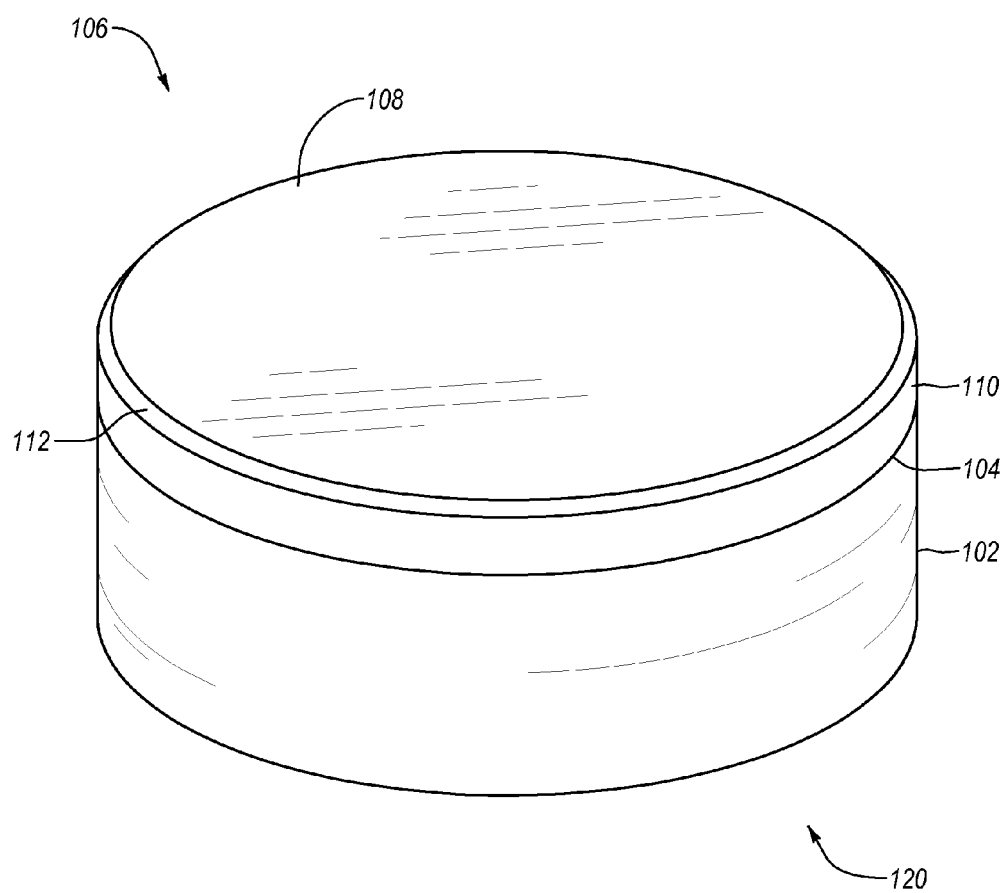
FIG. 1C is an isometric view of the PDC shown in FIG. 1B.

FIGS. 1B and 1C are cross-sectional and isometric views, respectively, of a PDC 120 formed by HPHT processing of the PDC precursor assembly 100 shown in FIG. 1A. The PDC 120 includes the PCD table 106 comprising a sintering aid material from the plurality of sintering aid particles that are at least saturated with carbon. The PCD table 106 includes a working upper surface 108, an interfacial surface 104, and at least one lateral surface 110 extending therebetween. Although the upper surface 108 is illustrated as being substantially planar, the upper surface 108 may have a nonplanar geometry, such as a convex or concave geometry. Furthermore, the PCD table 106 may include a chamfer 112 or other edge geometry that extends about the upper surface 106. For example, the chamfer 112 may be formed by grinding, lapping, laser machining, electro-discharge machining, or combinations of the foregoing. Additionally, other regions of the PCD table 106 may also function as a working region, such as the at least one lateral surface 110.

The substrate 102 (having any suitable geometry) of the PDC 120 is bonded to the interfacial surface 104 of the PCD table 106. Suitable materials for the substrate 102 include cemented carbides, such as titanium carbide, niobium carbide, tantalum carbide, vanadium carbide, tungsten carbide, or combinations of any of the preceding carbides cemented with iron, nickel, cobalt, or alloys thereof. In an embodiment, the substrate 102 may comprise cobalt-cemented tungsten carbide. Although the interfacial surface 104 of the substrate 102 is illustrated as being substantially planar, the interfacial surface may exhibit a selected nonplanar geometry and the back surface 104 of the PCD table 106 may exhibit a correspondingly configured geometry.

In order to efficiently sinter the mixture 105 of the plurality of sintering aid particles at least saturated with carbon and the plurality of diamond particles to form the PCD table 106 bonded to the substrate 102, the PDC precursor assembly 100 may be enclosed in a pressure transmitting medium, such as a refractory metal can, graphite structure, pyrophyllite, combinations thereof, or other suitable pressure transmitting structure to form a cell assembly. Examples of suitable gasket materials and cell structures for use in manufacturing PCD are disclosed in U.S. Pat. No. 6,338,754 and U.S. patent application Ser. No. 11/545,929, each of which is incorporated herein, in its entirety, by this reference. Another example of a suitable pressure transmitting material is pyrophyllite, which is commercially available from Wonderstone Ltd. of South Africa. The cell assembly, including the pressure transmitting medium, the mixture 105 of a plurality of sintering aid particles at least saturated with carbon and a plurality of diamond particles, and the substrate 102 is subjected to an HPHT process using an ultra-high pressure press at a temperature of at least about 1000° C. (e.g., about 1100° C. to about 2200° C., or about 1200° C. to about 1450° C.) and a pressure in the pressure transmitting medium of at least about 7.5 GPa (e.g., about 7.5 GPa to about 15 GPa) for a time sufficient to sinter the diamond particles together and form the PCD table 106 comprising directly bonded-together diamond grains. For example, the pressure in the pressure transmitting medium employed in the HPHT process may be at least about 8.0 GPa, at least about 9.0 GPa, at least about 10.0 GPa, at least about 11.0 GPa, at least about 12.0 GPa, or at least about 14 GPa. Further details about HPHT processing techniques that may be used to practice the embodiments disclosed herein are disclosed in U.S. Pat. No. 7,866,418, which is incorporated herein, in its entirety, by reference.

The pressure values employed in the HPHT processes disclosed herein refer to the pressure in the pressure transmitting medium at room temperature (e.g., about 25° C.) with application of pressure using an ultra-high pressure press and not the pressure applied to the exterior of the cell assembly. The actual pressure in the pressure transmitting medium at sintering temperature may be higher. The ultra-high pressure press may be calibrated at room temperature by embedding at least one calibration material that changes structure at a known pressure, such as PbTe, thallium, barium, or bismuth in the pressure transmitting medium. Further, optionally, a change in resistance may be measured across the at least one calibration material due to a phase change thereof. For example, PbTe exhibits a phase change at room temperature at about 6.0 GPa and bismuth exhibits a phase change at room temperature at about 7.7 GPa. Examples of suitable pressure calibration techniques are disclosed in G. Rousse, S. Klotz, A.

M. Saitta, J. Rodriguez-Carvajal, M. I. McMahon, B. Couzinet, and M. Mezouar, "Structure of the Intermediate Phase of PbTe at High Pressure," Physical Review B: Condensed Matter and Materials Physics, 71, 224116 (2005) and D. L. Decker, W. A. Bassett, L. Merrill, H. T. Hall, and J. D. Barnett, "High-Pressure Calibration: A Critical Review," J. Phys. Chem. Ref. Data, 1, 3 (1972).

During the HPHT process, the carbon-saturated sintering aid particles within the mixture 105 may at least partially melt during HPHT processing to facilitate diamond growth. Due to the additional carbon from the at least partially melted carbon-saturated sintering aid material, additional diamond may be grown between the diamond particles so that the diamond-diamond bond density increases. The PCD table 106 so-formed includes directly bonded-together diamond grains exhibiting diamond-to-diamond bonding (e.g., $sp^3$ bonding) therebetween. The plurality of bonded diamond grains defines a plurality of interstitial regions. While most of the interstitial regions include sintering aid material provided from the carbon-saturated sintering aid particles, some of the interstitial regions near the substrate 102 may include a catalyst material disposed therein infiltrated from the substrate 102, such as iron, nickel, cobalt, or alloys thereof. The catalyst material infiltrated from the substrate 102 helps metallurgically bond the PCD table 106 so formed to the substrate 102. In some embodiments, the sintering aid material within the interstitial regions of the PCD table 106 may still be at least saturated with carbon at standard temperature and pressure (i.e., 0° C. and 1 atmosphere). In other embodiments, the sintering aid material within the interstitial regions may still even remain supersaturated with carbon at standard temperature and pressure (i.e., 0° C. and 1 atmosphere). In some embodiments, the carbon-saturated sintering aid material present in the PCD table 106 may include one or more of carbon fibrules, carbon onions, C-12, C-13, graphite, other $sp^2$-carbon phases, metal carbide phases therein characteristic of the sintering aid material being at least saturated with carbon, or combinations thereof.

In embodiments in which at least a portion of the sintering aid material in the PCD table 106 is at least saturated with carbon, the carbon-saturated sintering aid material has less of a tendency to dissolve carbon therein at elevated temperatures. Therefore, at elevated temperatures commonly experienced during drilling when the PDC 120 is employed as a cutting element of a rotary drill bit, the carbon-saturated sintering aid material in the PCD table 106 does not significantly facilitate back conversion of the diamond grains to graphite and/or another by-product. For example, it is currently believed by the inventors that absent the sintering aid material being at least saturated with carbon, carbon from the diamond grains may be dissolved in the sintering aid material and precipitated as graphite under the non-diamond stable conditions typically experienced during drilling operations.

Figure 2A:
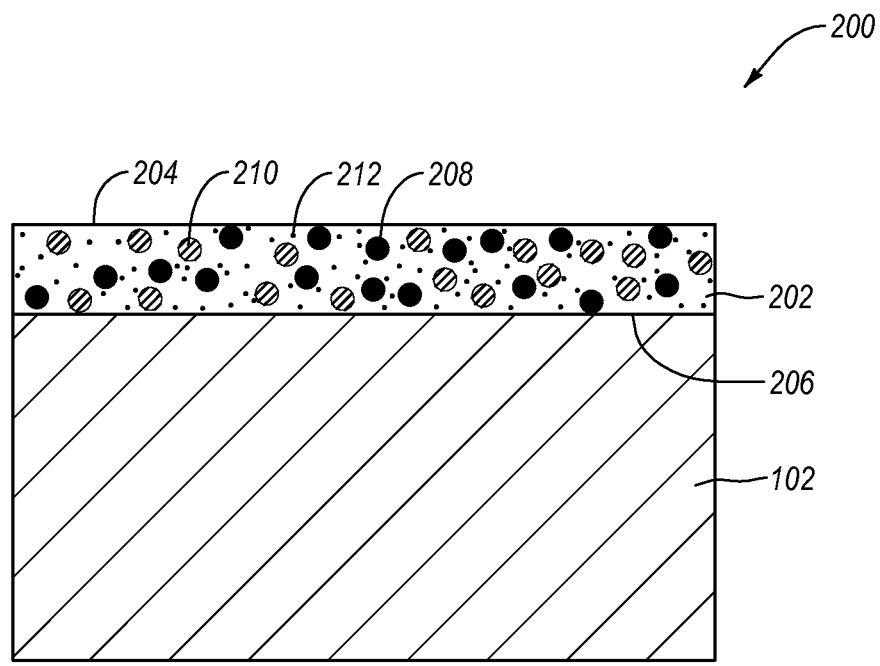
FIG. 2A is a cross-sectional view of an embodiment of a PDC precursor assembly including a mixture comprising a plurality of sintering aid particles at least saturated with carbon, a plurality of carbon-saturated sintering aid particles coated with submicron diamond particles, and a plurality of diamond particles positioned adjacent to a substrate.

FIG. 2A is a cross-sectional view of an embodiment of a PDC precursor assembly 200 including a mixture 202 comprising: (i) a plurality of sintering aid particles at least saturated with carbon 208, a plurality of carbon-saturated sintering aid particles coated with submicron diamond particles 210, or combinations thereof, (ii) and a plurality of diamond particles 212 positioned adjacent to a substrate 102. In this embodiment, a plurality of submicron diamond particles may be mixed with a plurality of sintering aid particles and non-diamond carbon and be subjected to any of the mechanical milling processes disclosed herein. The product from such mechanical alloying may result in the plurality of carbon-saturated sintering aid particles coated and/or embedded with submicron diamond particles 210.

The plurality of submicron diamond particles may exhibit one or more selected submicron sizes. The one or more submicron selected sizes may be determined, for example, by passing the diamond particles through one or more sizing sieves or by any other method. In an embodiment, the plurality of submicron diamond particles may include a relatively larger size and at least one relatively smaller size. As used herein, the phrases "relatively larger" and "relatively smaller" refer to particle sizes determined by any suitable method, which differ by at least a factor of two (e.g., 40 nm and 20 nm). More particularly, in various embodiments, the plurality of submicron diamond particles may include a portion exhibiting a relatively larger size (e.g., 900 nm, 800 nm, 700 nm, 600 nm, 500 nm, 400 nm, 300 nm, 200 nm, 150 nm, 120 nm, 100 nm, 80 nm) and another portion exhibiting at least one relatively smaller size (e.g., 450 nm, 400 nm, 350 nm, 300 nm, 250 nm, 200 nm, 150 nm, 100 nm, 75 nm, 60 nm, 50 nm, 40 nm, 20 nm, 10 nm, 8 nm, 2 nm, 1 nm, 0.5 nm, less than 0.5 nm, 0.1 nm, less than 0.1 nm). In an embodiment, the plurality of submicron diamond particles may include a portion exhibiting a relatively larger size between about 400 nm and about 150 nm and another portion exhibiting a relatively smaller size between about 12 nm and 2 nm. Of course, the plurality of submicron diamond particles may also include three or more different sizes (e.g., one relatively larger size and two or more relatively smaller sizes), without limitation.

Figure 2B:
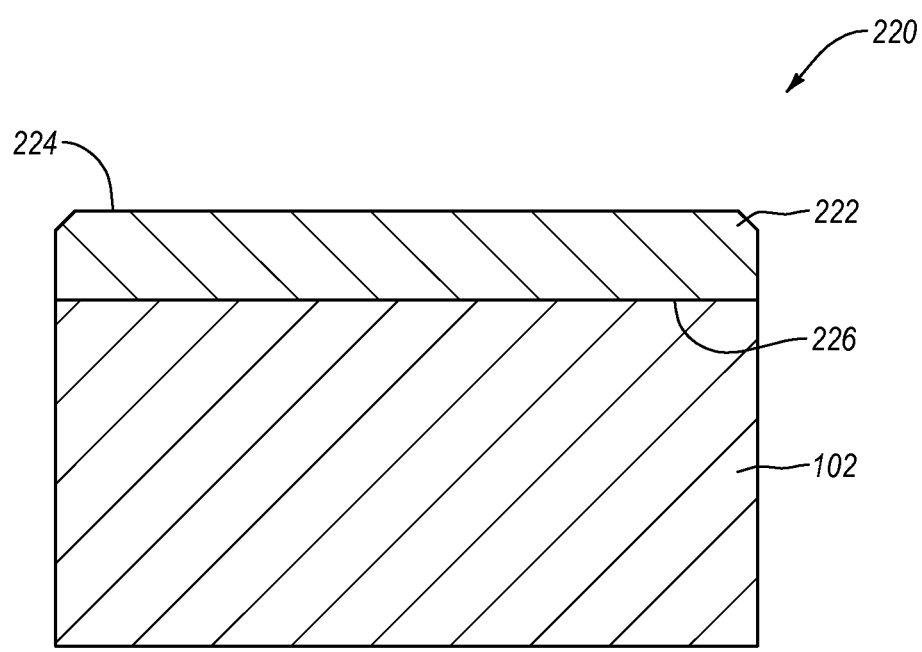
FIG. 2B is a cross-sectional view of a PDC formed by HPHT processing of the PDC precursor assembly shown in FIG. 2A.

FIG. 2B is a cross-sectional view of a PDC 220 formed by HPHT processing of the PDC precursor assembly 200 shown in FIG. 2A using any of the HPHT conditions disclosed herein. The PDC 220 comprises a PCD table 222 that includes a working upper surface 224 and an interfacial surface 226 bonded to the substrate 102. The PCD table 222 includes a plurality of directly bonded-together diamond grains exhibiting diamond-to-diamond bonding therebetween (e.g., $sp^3$ bonding) defining a plurality of interstitial regions.

The interstitial regions of the PCD table 222 may include a sintering aid material disposed therein provided from the plurality of sintering aid particles 208 that were at least saturated with carbon and/or a sintering aid material provided from the plurality of carbon-saturated sintering aid particles coated with submicron diamond particles 210 present in the mixture 202 of the PDC precursor assembly 200 in FIG. 2A. Catalyst material from the substrate 102 may also infiltrate into the mixture 202 during HPHT processing (e.g., cobalt from a cobalt-cemented tungsten carbide substrate) to occupy some of the interstitial regions adjacent to the substrate 102, which helps metallurgically bond the PCD table 222 to the substrate 102. In some embodiments, the sintering aid material within the interstitial regions of the PCD table 222 may be at least saturated or even supersaturated with carbon at standard temperature and pressure (i.e., 0° C. and 1 atmosphere). For example, the sintering aid material located in the interstitial regions of the PCD table 106 may be at least saturated with carbon and, in some embodiments, supersaturated with carbon for temperature and pressure conditions typically experienced during subterranean drilling operations. In some embodiments, the carbon-saturated sintering aid material may include one or more of carbon fibrules, carbon onions, carbon-12, carbon-13, graphite, other $sp^2$-carbon phases, metal carbide phases therein characteristic of the sintering aid material being at least saturated with carbon, or combinations thereof. It is believed that the presence of the carbon-saturated sintering aid material may provide the ability to offer more carbon during sintering and promote extra diamond-to-diamond bonding growth resulting in an increase of the diamond-to-diamond bond density and/or quality.

In another embodiment, the mixture 202 may be formed into a green body and positioned adjacent to the substrate 102, and subjected to HPHT processing to form the PDC 220. A green body may assist with manufacturing and handling of the mixture 202 because a suitable sacrificial binder (e.g., a wax or polymer binder) is added to the mixture 202 that binds the particles together.

Figure 3A:
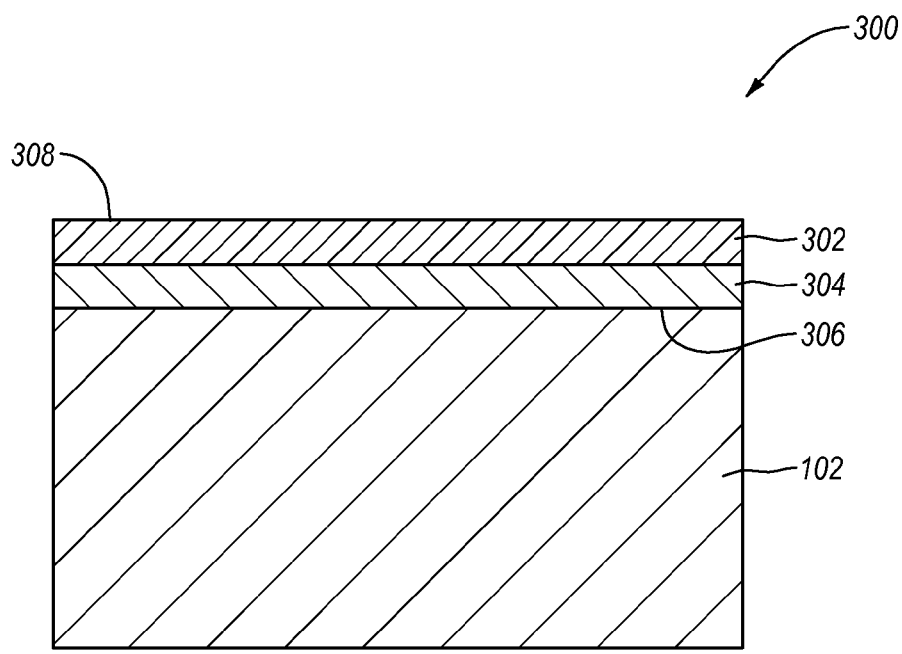
FIG. 3A is a cross-sectional view of an embodiment of a PDC precursor assembly including at least one layer of a plurality of carbon-saturated sintering aid particles disposed between at least one layer of a plurality of diamond particles and a substrate.

FIG. 3A is a cross-sectional view of an embodiment of a PDC precursor assembly 300 including at least one layer of a plurality of carbon-saturated sintering aid particles 304 positioned between at least one layer of a plurality of diamond particles 302 and a substrate 102. The plurality of carbon-saturated sintering aid particles within the region 304 may be fabricated employing any of the mechanical alloying processes disclosed herein in conjunction with any of the sintering aid materials discussed herein. Similarly, the plurality of diamond particles may exhibit any of the size distributions previously discussed. In another embodiment, the at least one layer of the plurality of diamond particles 302 may be disposed between the substrate 102 and the at least one layer of the plurality of carbon-saturated sintering aid particles 304.

Figure 3B:
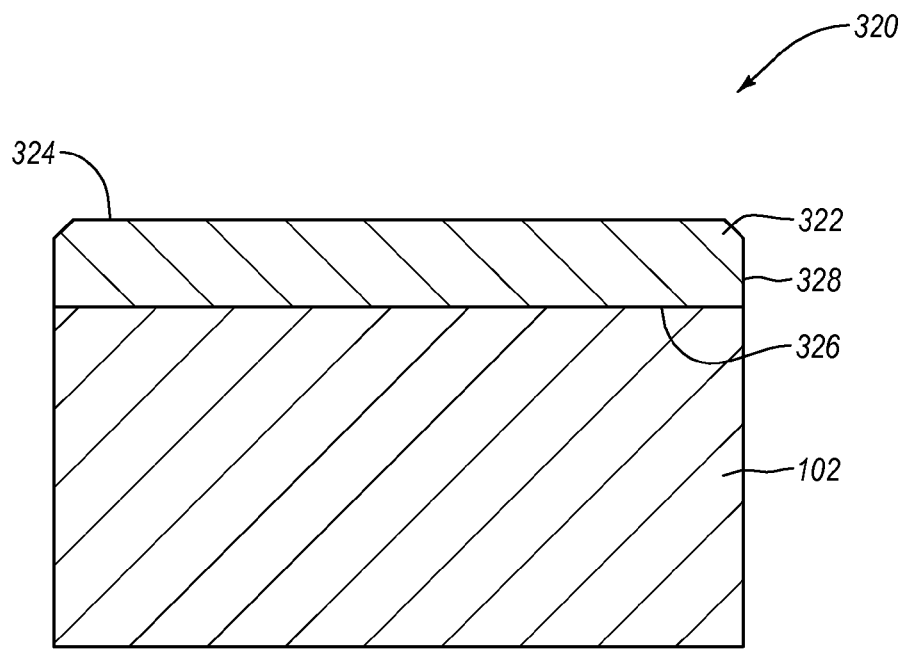
FIG. 3B is a cross-sectional view of a PDC formed by HPHT processing of the PDC precursor assembly shown in FIG. 3A.

FIG. 3B is a cross-sectional view of a PDC 320 formed by HPHT processing of the PDC precursor assembly 300 shown in FIG. 3A using any of the HPHT conditions disclosed herein. The PDC 320 comprises a PCD table 322 that includes an upper surface 324 and an interfacial surface 326 bonded to the substrate 102. The PCD table 322 includes a plurality of directly bonded-together diamond grains exhibiting diamond-to-diamond bonding therebetween (e.g., $sp^3$ bonding) defining a plurality of interstitial regions.

During HPHT processing, the sintering aid material from the layer 304 at least partially melts and infiltrates into the plurality of diamond particles of the layer 302 to facilitate formation of the PCD table 322 from the diamond particles and promotes diamond growth. As with other embodiments, the sintering aid material located in the interstitial regions of the PCD table 322 may be provided from the plurality of carbon-saturated sintering aid particles that are at least saturated with carbon. For example, after HPHT processing, the sintering aid material may still be at least saturated or even still supersaturated. Catalyst material from the substrate 102 may also infiltrate into the diamond particles during HPHT processing (e.g., cobalt from a cobalt-cemented tungsten carbide substrate) to occupy some of the interstitial regions (e.g., adjacent to the substrate 102), which may help metallurgically bond the PCD table 322 to the substrate 102.

FIGS. 4A-4F are cross-sectional views illustrating a method of fabricating a PDC according to an embodiment that comprises forming a PCD table from a plurality of sintering aid particles at least saturated with carbon and a plurality of diamond particles in a first HPHT process followed by at least partially leaching the so-formed PCD table. A PDC is subsequently formed by bonding the at least partially leached PCD table to a substrate in a second HPHT process.

Figure 4A:
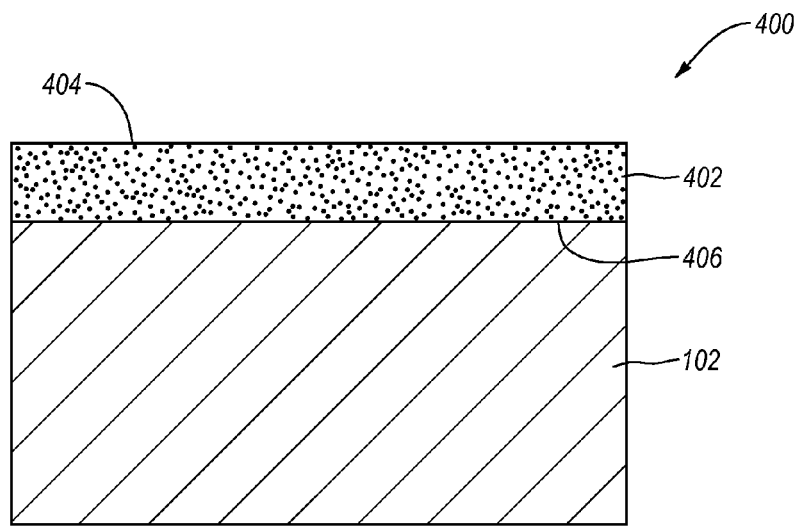
FIGS. 4A-4F are cross-sectional views illustrating different stages in various embodiments of a method for fabricating a PDC and the PDC so formed.

FIG. 4A illustrates a PDC precursor assembly 400 including a mixture 402 comprising a plurality of carbon-saturated sintering aid particles mixed with a plurality of diamond particles assembled with a substrate 102. The plurality of carbon-saturated sintering aid particles may be fabricated employing any of the mechanical alloying processes and any of the sintering aid materials discussed herein. Similarly, the plurality of diamond particles may be of any of the size distributions previously discussed.

Figure 4B:
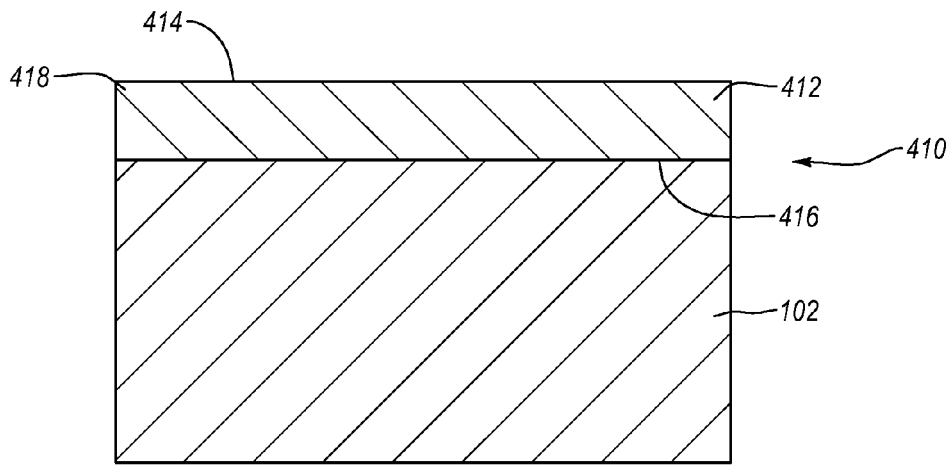

Referring to FIG. 4B, a PDC 410 is formed by the HPHT processing of the PDC precursor assembly 400 shown in FIG. 4A using any of the HPHT conditions disclosed herein. The PDC 410 comprises a PCD table 412 that includes an upper surface 414, an optional chamfer 418, and an interfacial surface 416 bonded to the substrate 102. The PCD table 412 includes a plurality of directly bonded-together diamond grains exhibiting diamond-to-diamond bonding therebetween (e.g., $sp^3$ bonding) defining a plurality of interstitial regions.

During HPHT processing, the sintering aid material from the plurality of carbon-saturated sintering aid particles facilitate formation of the PCD table 412 from the plurality of diamond particles and promotes diamond growth as previously discussed. As with other embodiments, the sintering aid material located in the interstitial regions of the PCD table 412 so formed may be provided from the plurality of carbon-saturated sintering aid particles. For example, the sintering aid material may still be at least saturated or even still supersaturated after HPHT processing. Catalyst material from the substrate 102 may also infiltrate into the mixture 402 during HPHT processing (e.g., cobalt from a cobalt-cemented tungsten carbide substrate) to occupy some of the interstitial regions adjacent to the substrate 102, which helps metallurgically bond the PCD table 412 to the substrate 102.

Figure 4C:
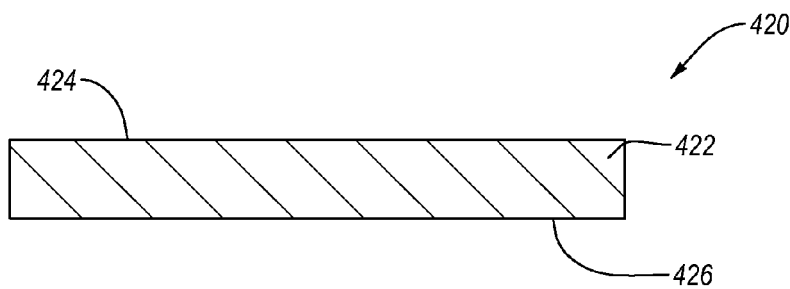
Figure 4D:
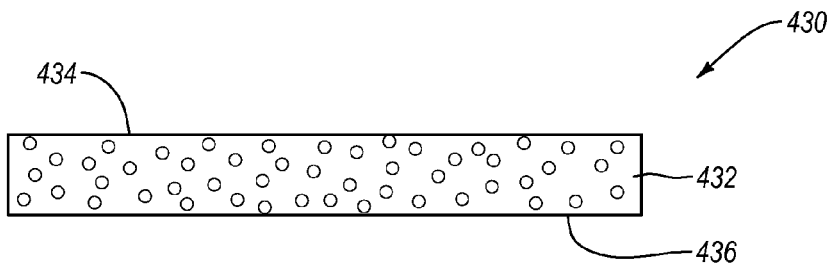

The PCD table 412, shown in FIG. 4B, may be separated from the substrate 102 using a grinding process, wire-electrical-discharge machining ("wire EDM"), combinations thereof, or another suitable material-removal process. FIG. 4C shows the separated PCD table 422. The separated PCD table 422 may be leached by immersion in an acid, such as aqua-regia, nitric acid, hydrofluoric acid, or subjected to another suitable process to remove at least a portion of the catalyst material and carbon-saturated sintering aid material from the interstitial regions of the separated PCD table 422 and form an at least partially leached PCD table 432 as shown in FIG. 4D. For example, the separated PCD table 422 may be immersed in the acid for about 2 to about 7 days (e.g., about 3, 5, or 7 days) or for a few weeks (e.g., about 4 weeks) depending on the process employed. In other embodiments, the PCD table 412 may not be formed on the substrate 102, thereby eliminating the need for removal of the substrate 102.

Figure 4E:
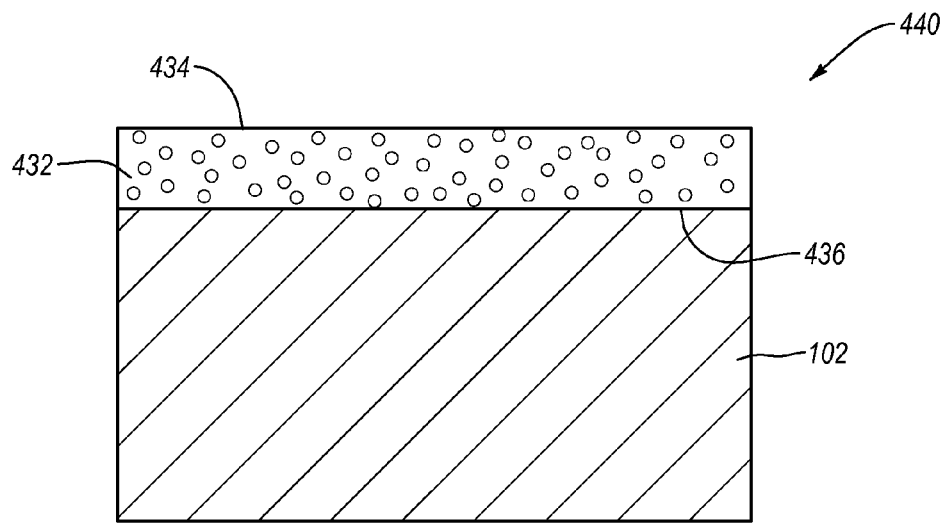
Figure 4F:
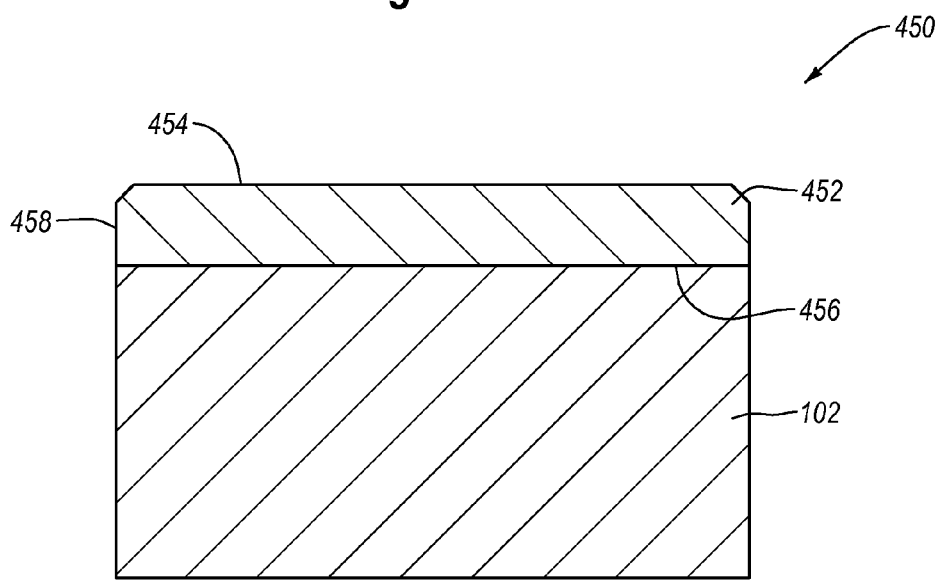

Referring to FIG. 4E, a PDC precursor assembly 440 may be formed by positioning an additional substrate 102 adjacent to the at least partially leached PCD table 432. The at least partially leached PCD table 432 includes a working surface 434 and an opposing interfacial surface 436 positioned adjacent to the substrate 102. The at least partially leached PCD table 432 also includes a plurality of interstitial regions that were previously occupied by the sintering aid and/or catalyst material. These previously occupied interstitial regions form a network of at least partially interconnected pores that extend between the working surface 434 and interfacial surface 436. The assembly 440 may be subject to HPHT processing for a time sufficient to bond the at least partially leached PCD table 432 to the substrate 102 and form a PDC 450 as shown in FIG. 4F.

The HPHT process bonds the at least partially leached PCD table 432 to the substrate 102 and may cause a metallic infiltrant from the substrate 102 or another source to infiltrate into the interstitial regions of the at least partially leached PCD table 432. The HPHT temperature may be sufficient to melt at least one constituent of the substrate 102 (e.g., cobalt, nickel, iron, alloys thereof, or another constituent) that infiltrates the at least partially leached PCD table 432. The PDC 450 so-formed includes a PCD table 452 in which the interstitial regions thereof are at least partially filled with the metallic infiltrant. It is noted that the PDC 450 may exhibit other geometries than the geometry illustrated in FIG. 4F. For example, the PDC 450 may exhibit a non-cylindrical geometry. For example, the PCD table 452 may be chamfered, as illustrated, after HPHT processing. Optionally, the PDC table 452 may be leached to at least partially remove the metallic infiltrant.

FIGS. 5A-5F are cross-sectional views illustrating a method of fabricating a PDC according to an embodiment that comprises forming a PCD table from a plurality of sintering aid particles at least saturated with carbon and a plurality of diamond particles in a first HPHT process and at least partially leaching the so-formed PCD table. The at least partially leached PCD table is then cleaned to remove at least some of the leaching by-products therein. A PDC is subsequently formed by positioning a plurality of carbon-saturated sintering aid particles between the at least partially leached PCD table and a substrate and bonding in a second HPHT process.

Figure 5A:
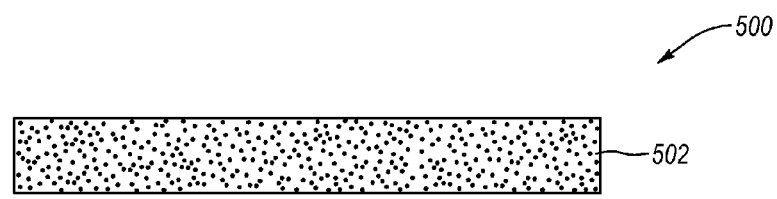
FIGS. 5A-5F are cross-sectional views illustrating different stages in various embodiments of a method for fabricating a PDC and the PDC so formed.

FIG. 5A illustrates an assembly 500 including a mixture 502 comprising a plurality of carbon-saturated sintering aid particles and a plurality of diamond particles. The plurality of carbon-saturated sintering aid particles found in the mixture 502 may be fabricated using any of the sintering aid materials and mechanical alloying methods disclosed herein. Similarly, the plurality of diamond particles within the mixture 502 may exhibit of any of the size distributions disclosed herein. The mixture 502 including the plurality of carbon-saturated sintering aid particles and the plurality of diamond particles may be subjected to HPHT processing to form the PCD table 512 shown in FIG. 5B using any of the HPHT conditions disclosed herein. The PCD table 512 comprises a working surface 514 and an interfacial surface 518. The PCD table 512 further includes a plurality of directly bonded-together diamond grains exhibiting diamond-to-diamond bonding therebetween (e.g., $sp^3$ bonding) defining a plurality of interstitial regions.

During HPHT processing, the sintering aid material from the plurality of carbon-saturated sintering aid particles facilitates formation of the PCD table 512 from the plurality of diamond particles and promotes diamond growth as previously discussed. As with other embodiments, the sintering aid material located in the interstitial regions of the PCD table 512 so formed may be provided from the plurality of carbon-saturated sintering aid particles. For example, the sintering aid material may still be at least saturated or even still supersaturated after HPHT processing.

Figure 5B:
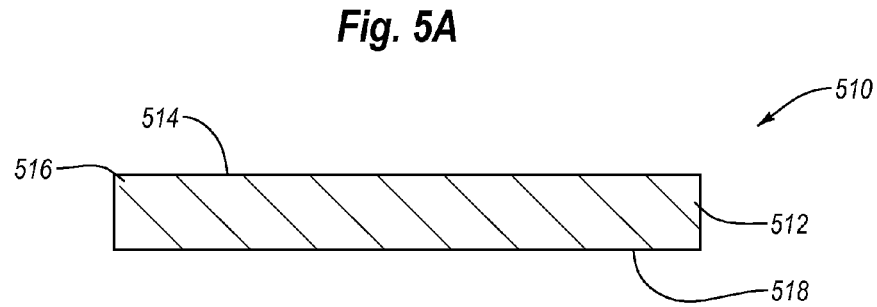
Figure 5C:
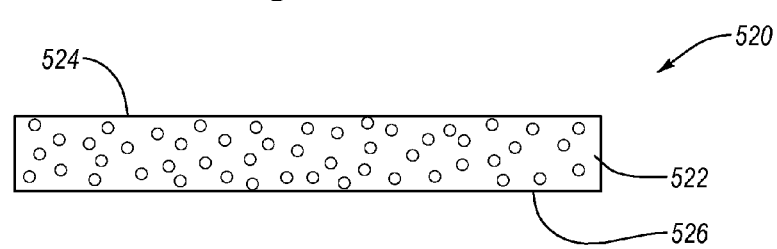

As shown in FIG. 5C, the as-sintered the PCD table 512 may be subject to leaching using any of the methods previously described to remove at least a portion of the sintering aid material from the interstitial regions of the PCD table 512 and form an at least partially leached PCD table 522 as shown in FIG. 5C.

As a result of the leaching process used to remove at least a portion of the sintering aid material, the at least partially leached PCD table 522 shown in FIGS. 5B and 5C may include leaching by-products. For example, leaching agents used to remove, for example, cobalt from the interstitial regions may leave one or more types of residual salts, one or more types of oxides, combinations of the foregoing, or another leaching by-product within at least some of the interstitial regions of the at least partially leached PCD table 522. For example, depending upon the chemistry of the leaching solution, the leaching by-products may comprise a salt of nitric acid, hydrochloric acid, phosphoric acid, acetic acid, or mixtures of the foregoing. For example, the salt may be cobalt nitrate or cobalt chloride. The leaching by-products may also comprise a metal oxide (e.g., an oxide of tungsten, cobalt or other metal) and/or another type of metal present in the sintering aid of the at least partially leached PCD table 522 prior to leaching. It is currently believed that such leaching by-products may block, obstruct, or otherwise inhibit infiltration of the at least partially leached PCD table 522 with metallic infiltrant when the at least partially leached PCD table 522 is attempted to be bonded to a substrate.

Figure 5D:
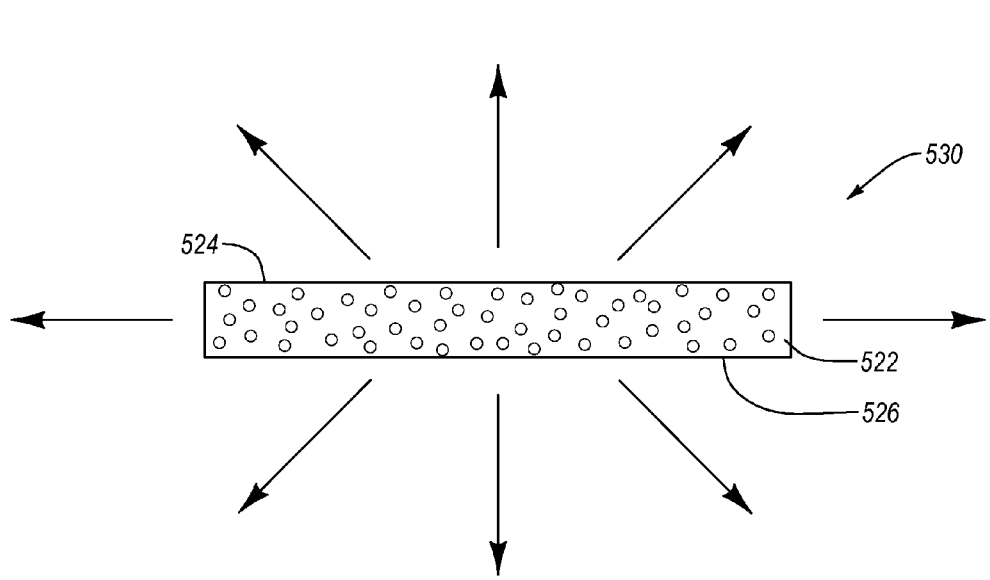

Referring to FIG. 5D, at least some of the leaching by-products may be removed from the at least partially leached PCD table 522. For example, as shown in FIG. 5D, at least some of the leaching by-products may be removed by subjecting the at least partially leached PCD table 522 to a thermal-cleaning process. In such a thermal-cleaning process, the at least partially leached PCD table 522 may be heated under partial vacuum (e.g., at a pressure less than ambient atmospheric pressure) to a temperature sufficient to sublimate at least some of the leaching by-products present in the at least partially leached PCD table 522, but below a temperature at which the diamond grains of the at least partially leached PCD table 522 may significantly degrade. For example, the at least partially leached PCD table 522 may be heated in a vacuum furnace at a temperature between at least about 600° C. and less than about 700° C. for about 0.5 hours to about 2.0 hours or more. In an embodiment, the at least partially leached PCD table 522 may be heated in a vacuum furnace at a temperature of about 650° C. for about 1 hour to about 1.5 hours.

In another embodiment, at least some of the leaching by-products may be removed from the at least partially leached PCD table 522 using a chemical cleaning process. For example, the at least partially leached PCD table 522 may be immersed in hydrofluoric acid. The concentration of the hydrofluoric acid and the immersion time of the at least partially leached PCD table 522 in the hydrofluoric acid may be selected so that at least some of the leaching by-products and, in some embodiments, substantially all of the leaching by-products may be removed from the at least partially leached PCD table 522.

In an embodiment of a chemical cleaning process, at least some of the leaching by-products may be removed using an ultrasonic cleaning process. For example, the at least partially leached PCD table 522 of FIG. 5C may be immersed in a selected solvent and ultrasonic energy applied to the selected solvent for a selected period of time to effect removal of at least some of the leaching by-products and, in some embodiments, substantially all of the leaching by-products may be removed from the at least partially leached PCD table 522. The selected solvent may be an aqueous solution (e.g., hydrofluoric acid) or an organic solvent.

Additional details about suitable cleaning techniques for removing the leaching by-products are disclosed in U.S. Pat. No. 7,845,438. U.S. Pat. No. 7,845,438 is incorporated herein, in its entirety, by this reference.

In another embodiment, following removal of at least some of the leaching by-products, the interfacial surface 526 of the at least partially leached PCD table 522 may be bonded to a substrate in an HPHT bonding process to form a PDC in the same manner as the at least partially leached PCD table 432 was bonded to form the PDC 450 shown in FIGS. 4E and 4F. During the HPHT bonding process, the at least partially leached PCD table 522 may be infiltrated only with the metallic infiltrant from the substrate, such as cobalt from a cobalt-cemented carbide substrate.

Figure 5E:
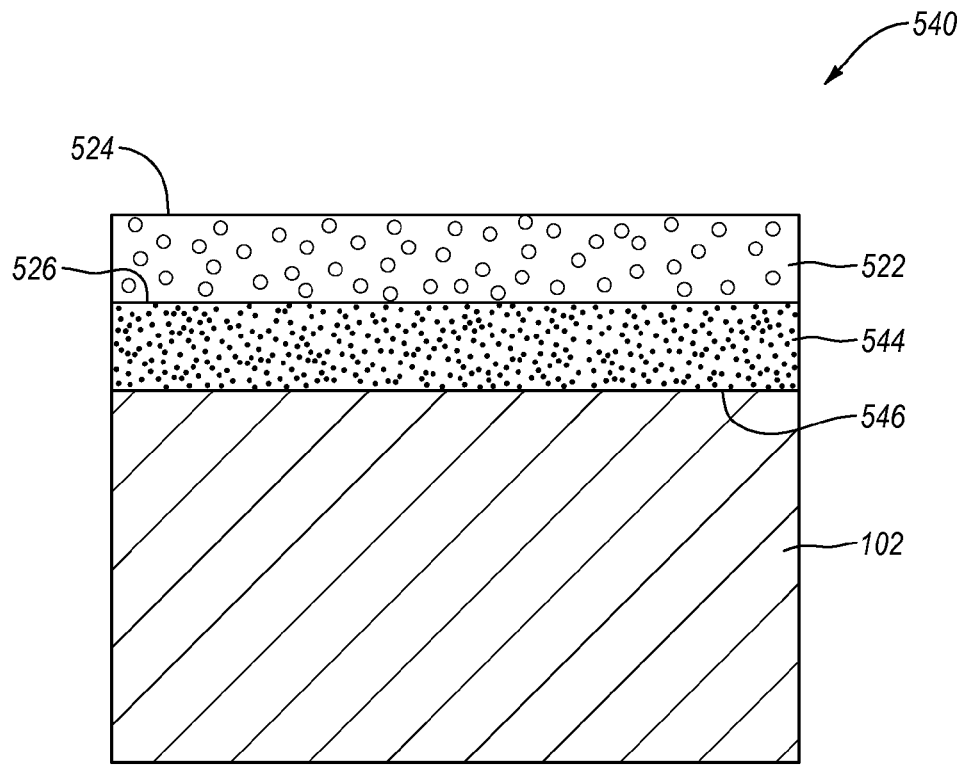
Figure 5F:
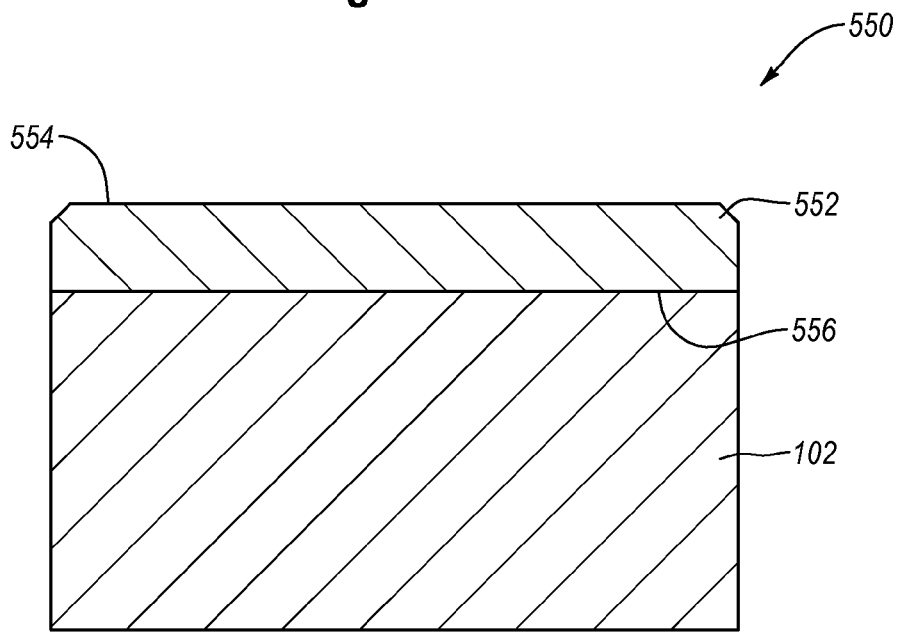

Referring to FIG. 5E, an assembly 540 may be formed by positioning an at least carbon-saturated infiltrant particle layer 544 between the substrate 102 and the at least partially leached and cleaned PCD table 522. However, in other embodiments, the at least partially leached and cleaned PCD table 522 may be positioned between the substrate 102 and the at least carbon-saturated infiltrant particle layer 544. For example, the at least carbon-saturated infiltrant particle layer 544 includes carbon-saturated particles made from any of the foregoing sintering aid particles that have been at least saturated with carbon. For example, the carbon-saturated particles may be unbounded or in the form of a green body. However, depending upon the infiltration conditions, composition, nature of the carbon-saturated particles, or combinations thereof, the carbon-saturated particles may or may not function as a catalyst. The at least partially leached PCD table 522 also includes a plurality of interstitial regions that were previously occupied by a sintering aid material provided from the carbon-saturated sintering aid particles within mixture 502 (shown in FIG. 5A) and form a network of at least partially interconnected pores that extend between the working surface 524 and interfacial surface 526. The assembly 540 may be subject to HPHT processing for a time sufficient to infiltrate and bond the at least partially leached and cleaned PCD table 522 to the substrate 102 and form a PDC 550 as shown in FIG. 5F. The HPHT process bonds the at least partially leached PCD table 522 to the substrate 102 and may cause a metallic infiltrant from the substrate 102 and a carbon-saturated infiltrant from the carbon-saturated infiltrant particles to infiltrate the interstitial regions of the at least partially leached PCD table 522. The PDC 550 so-formed includes a PCD table 552 in which the interstitial regions thereof are at least partially filled with the infiltrant. At least some of the interstitial regions are occupied by infiltrant provided from the carbon-saturated infiltrant particles of the layer 544, while interstitial regions at or near the substrate 102 may be occupied by the metallic infiltrant from the substrate 102. The infiltrant provided from the carbon-saturated infiltrant particles of the layer 544 may still be at least saturated or even still supersaturated with carbon after HPHT processing. It is currently believed that when the infiltrant remains at least supersaturated after HPHT processing/infiltrant, the thermal stability of the PCD table 552 may be enhanced because back conversion of the diamond grains to graphite or other reaction product is reduced.

In some embodiments, the at least partially leached PCD table 522 may be fabricated in a conventional manner. The conventionally fabricated at least partially leached PCD table may then be attached to the substrate 102 as shown and described in FIGS. 5E and 5F.

Figure 1D:
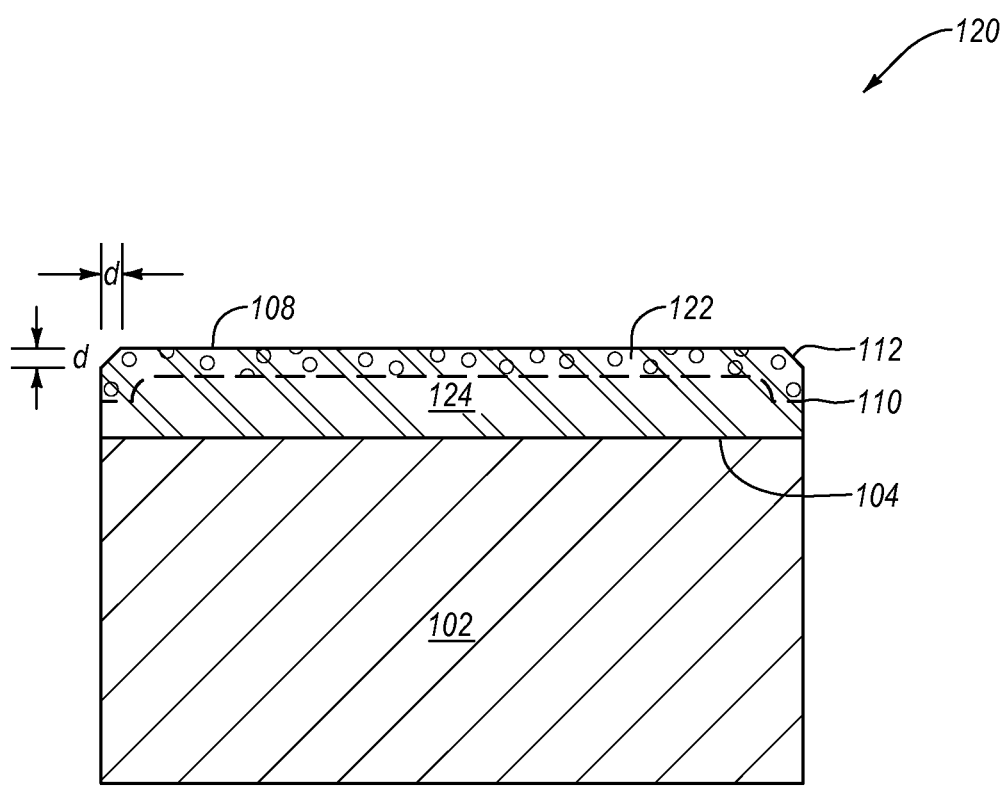
FIG. 1D is a cross-sectional view of the PDC shown in FIGS. 1B and 1C in which the PCD table has been leached to a selected depth according to an embodiment.

In any of the PDC embodiments disclosed herein, the PCD table may be subjected to a leaching process (e.g., an acid leaching process) to at least partially remove the sintering aid material disposed in the interstitial regions of the PCD table to a selected depth from one or more of the upper working surface, the chamfer (if present), or the at least one lateral surface. For example, according to an embodiment, FIG. 1D is a cross-sectional view of the PDC 120 in which the PCD table 110 has been leached to a selected depth "d" to form a leached region 122, with the unaffected underlying PCD table 106 labeled as region 124. For example, the selected depth "d" may be greater than about 50 μm, such as about 50 μm to about 800 μm, about 200 μm to about 800 μm, about 400 μm to about 800 μm, or about 250 μm to about 500 μm.

Figure 6:
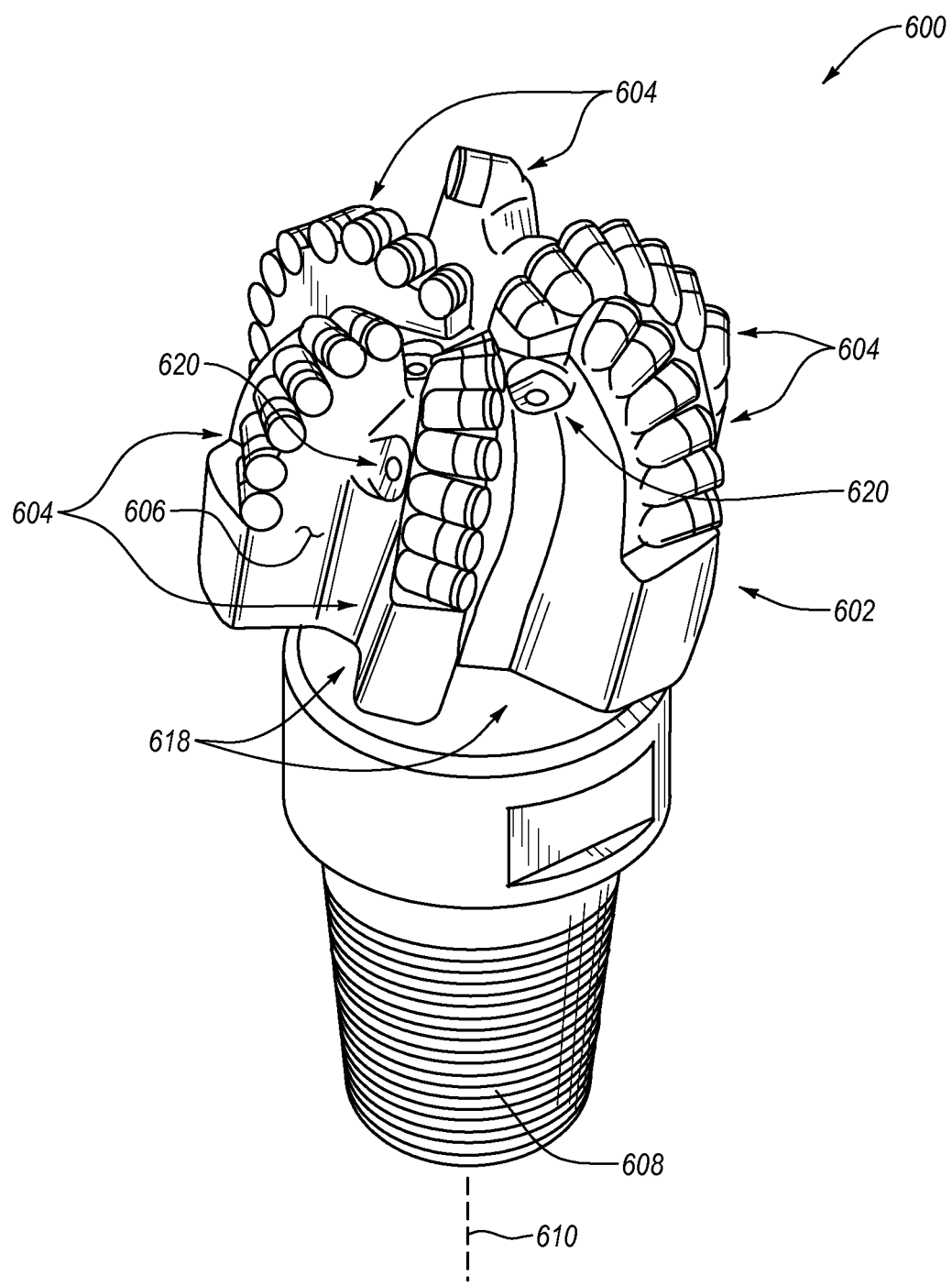
FIGS. 6 and 7 are isometric and top elevation views, respectively, of an embodiment of a rotary drill bit that may employ one or more of the disclosed PDC embodiments.
Figure 7:
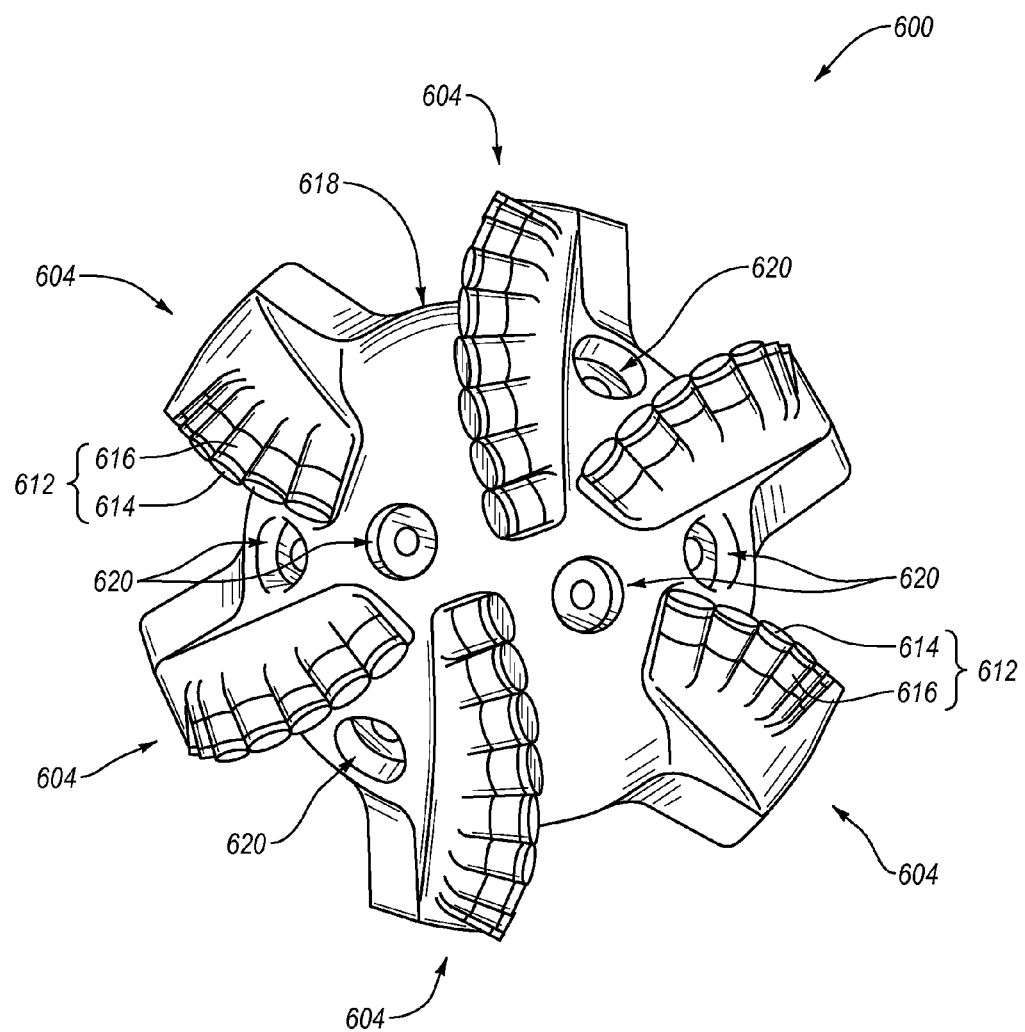

FIG. 6 is an isometric view and FIG. 7 is a top elevation view of a rotary drill bit 600 according to an embodiment. The rotary drill bit 600 includes at least one PDC fabricating according to any of the previously described PDC embodiments. The rotary drill bit 600 comprises a bit body 602 that includes radially and longitudinally extending blades 604 with leading faces 606, and a threaded pin connection 608 for connecting the bit body 602 to a drilling string. The bit body 602 defines a leading end structure configured for drilling into a subterranean formation by rotation about a longitudinal axis 610 and application of weight-on-bit. At least one PDC cutting element, manufactured and configured according to any of the previously described PDC embodiments (e.g., the PDC 120, 220, 320, 450, or 550), may be affixed to rotary drill bit 600 by, for example, brazing, mechanical affixing, or another suitable technique. With reference to FIG. 6, each of a plurality of PDCs 612 is secured to the blades 604. For example, each PDC 612 may include a PCD table 614 bonded to a substrate 616. More generally, the PDCs 612 may comprise any PDC disclosed herein, without limitation. In addition, if desired, in an embodiment, a number of the PDCs 612 may be conventional in construction. Also, circumferentially adjacent blades 604 define so-called junk slots 618 therebetween, as known in the art. Additionally, the rotary drill bit 600 includes a plurality of nozzle cavities 620 for communicating drilling fluid from the interior of the rotary drill bit 600 to the PDCs 612.

FIGS. 6 and 7 merely depict one embodiment of a rotary drill bit that employs at least one cutting element comprising a PDC fabricated and structured in accordance with the disclosed embodiments, without limitation. The rotary drill bit 600 is used to represent any number of earth-boring tools or drilling tools, including, for example, core bits, roller-cone bits, fixed-cutter bits, eccentric bits, bicenter bits, reamers, reamer wings, mining rotary drill bits, or any other downhole tool including PDCs, without limitation. For example, the PDCs disclosed herein may be employed in roof bolt drill bits disclosed in U.S. Application Publication No. 2011/0284294 filed on 9 Mar. 2009, which is incorporated herein, in its entirety, by this reference.

The PDCs disclosed herein may also be utilized in applications other than rotary drill bits. For example, the disclosed PDC embodiments may be used in thrust-bearing assemblies, radial bearing assemblies, wire-drawing dies, artificial joints, machining elements, and heat sinks.

Figure 8:
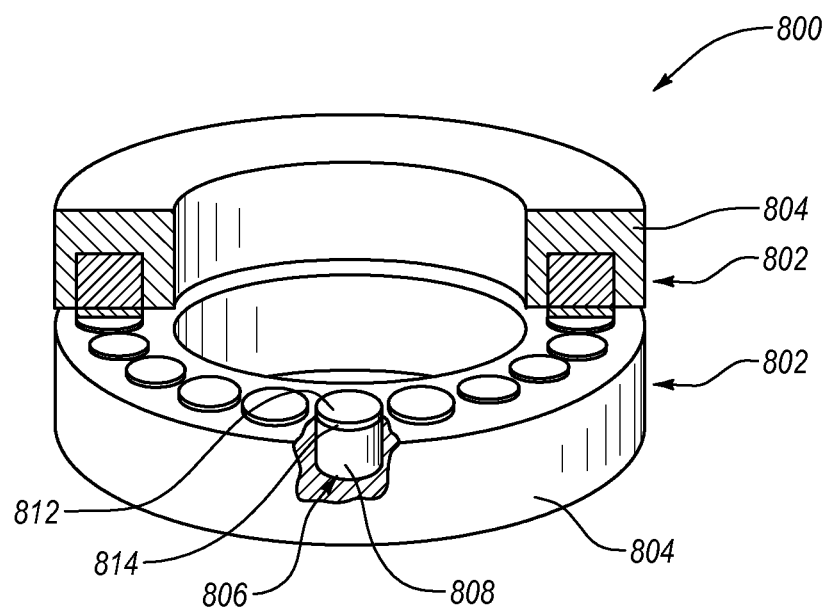
FIG. 8 is an isometric cut-away view of an embodiment of a thrust-bearing apparatus that may utilize one or more of the disclosed PDC embodiments.

FIG. 8 is an isometric cut-away view of a thrust-bearing apparatus 800 according to an embodiment, which may utilize any of the disclosed PDC embodiments as bearing elements. The thrust-bearing apparatus 800 includes respective thrust-bearing assemblies 802. Each thrust-bearing assembly 802 includes an annular support ring 804 that may be fabricated from a material, such as carbon steel, stainless steel, or another suitable material. Each support ring 804 includes a plurality of recesses (not labeled) that receives a corresponding bearing element 806. Each bearing element 806 may be mounted to a corresponding support ring 804 within a corresponding recess by brazing, press-fitting, using fasteners, or another suitable mounting technique. One or more, or all of bearing elements 806 may be configured according to any of the disclosed PDC embodiments. For example, each bearing element 806 may include a substrate 808 and a PCD table 814, with the PCD table 814 including a bearing surface 812.

In use, the bearing surfaces 812 of one of the thrust-bearing assemblies 802 bears against the opposing bearing surfaces 812 of the other one of the bearing assemblies 802. For example, one of the thrust-bearing assemblies 802 may be operably coupled to a shaft to rotate therewith and may be termed a "rotor." The other one of the thrust-bearing assemblies 802 may be held stationary and may be termed a "stator."

Figure 9:
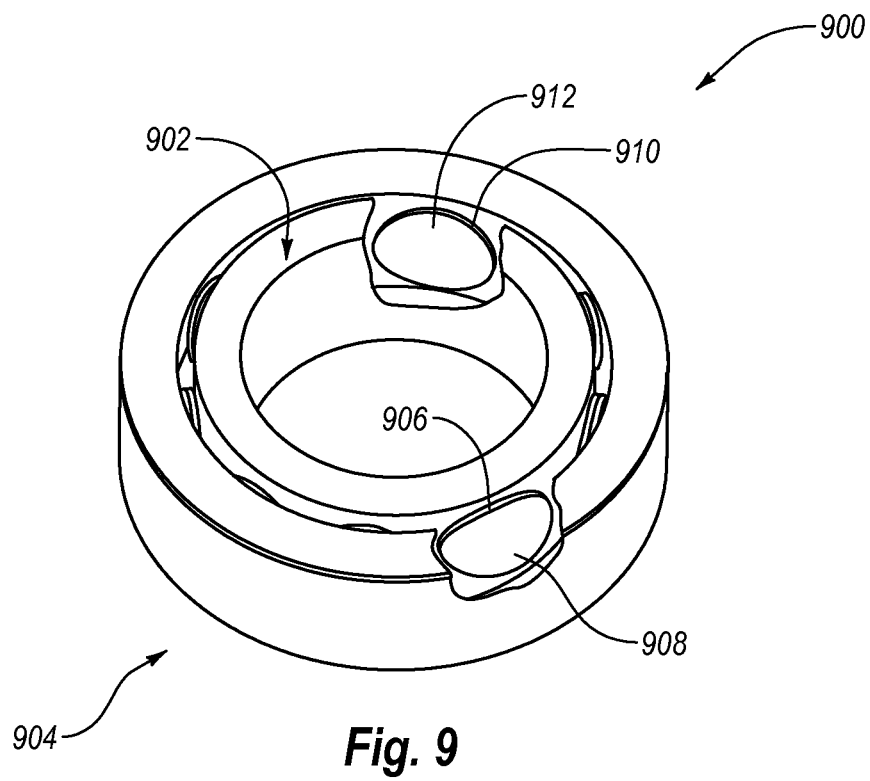
FIG. 9 is an isometric cut-away view of an embodiment of a radial bearing apparatus that may utilize one or more of the disclosed PDC embodiments.

FIG. 9 is an isometric cut-away view of a radial bearing apparatus 900 according to an embodiment, which may utilize any of the disclosed PDC embodiments as bearing elements. The radial bearing apparatus 900 includes an inner race 902 positioned generally within an outer race 904. The outer race 904 includes a plurality of bearing elements 906 affixed thereto that have respective bearing surfaces 908. The inner race 902 also includes a plurality of bearing elements 910 affixed thereto that have respective bearing surfaces 912. One or more, or all of the bearing elements 906 and 910 may be configured according to any of the PDC embodiments disclosed herein. The inner race 902 is positioned generally within the outer race 904, with the inner race 902 and outer race 904 configured so that the bearing surfaces 908 and 912 may at least partially contact one another and move relative to each other as the inner race 902 and outer race 904 rotate relative to each other during use.

Although the various embodiments of methods disclosed herein are directed to employing carbon-saturated sintering aid materials to facilitate forming PCD materials and structures. In other embodiments, the carbon-saturated sintering aid materials may be replaced with any of the sintering aid materials disclosed herein that are at least saturated with hexagonal boron nitride via mechanical milling a sintering aid material and hexagonal boron nitride. Cubic boron nitride particles may be sintered in the presence of the sintering aid material at least saturated with hexagonal boron nitride to form polycrystalline cubic boron nitride.

While various aspects and embodiments have been disclosed herein, other aspects and embodiments are contemplated. The various aspects and embodiments disclosed herein are for purposes of illustration and are not intended to be limiting. Additionally, the words "including," "having," and variants thereof (e.g., "includes" and "has") as used herein, including the claims, are open ended and shall have the same meaning as the word "comprising" and variants thereof (e.g., "comprise" and "comprises").

What is claimed is:

1. A method of fabricating a polycrystalline diamond compact, comprising:
    providing an at least partially leached polycrystalline diamond body including a plurality of bonded diamond grains exhibiting diamond-to-diamond bonding therebetween and defining a plurality of interstitial regions;
    forming an assembly including the at least partially leached polycrystalline diamond body, a substrate, and an at least carbon-saturated infiltrant layer positioned between the at least partially leached polycrystalline diamond body, the at least carbon-saturated infiltrant layer including at least carbon-saturated material at least saturated with non-diamond carbon; and
    subjecting the assembly to a high-pressure/high-temperature process effective to infiltrate at least a portion of the plurality of interstitial regions of the at least partially leached polycrystalline diamond body with at least a portion of the at least carbon-saturated material from the at least carbon-saturated infiltrant layer.

2. The method of claim 1 wherein the at least carbon-saturated material includes carbon-supersaturated material.

3. The method of claim 1 wherein the at least carbon-saturated material includes at least one material selected from the group consisting of cobalt, nickel, iron, copper, aluminum, titanium, tungsten, niobium, zirconium, tantalum, silicon, and boron.

4. The method of claim 1 wherein the at least carbon-saturated material includes at least one member selected from the group consisting of copper particles supersaturated with the non-diamond carbon and nickel particles supersaturated with the non-diamond carbon.

5. The method of claim 1 wherein the non-diamond carbon is provided from at least one material selected from the group consisting of lamp black, graphite, carbon-12 graphite, carbon-13 graphite, carbon nanotubes, graphene, amorphous carbon, and fullerenes.

6. The method of claim 1 wherein the at least carbon saturated material includes a plurality of at least carbon-saturated material particles.

7. The method of claim 1 wherein the at least partially leached polycrystalline diamond body is formed by a process including:
    at least saturating a sintering aid material with non-diamond carbon to form a carbon-saturated sintering aid material;
    sintering a plurality of diamond particles in the presence of the carbon-saturated sintering aid material to form a polycrystalline diamond body;
    at least partially leaching the sintering aid material from the polycrystalline diamond body to form the at least partially leached polycrystalline diamond body.

8. The method of claim 7 wherein the sintering aid material includes a plurality of sintering aid particles, and wherein at least saturating a sintering aid material with non-diamond carbon to form a carbon-saturated sintering aid includes supersaturating the plurality of sintering aid particles with the non-diamond carbon.

9. The method of claim 8 wherein the plurality of sintering aid particles includes at least one material selected from the group consisting of cobalt, nickel, iron, copper, aluminum, titanium, tungsten, niobium, zirconium, tantalum, silicon, and boron.

10. The method of claim 7, further comprising:
    wherein the carbon-saturated sintering aid material includes carbon-saturated sintering aid particles;
    mixing the carbon-saturated sintering aid particles with the plurality of diamond particles to form a mixture;
    wherein sintering a plurality of diamond particles in the presence of the carbon-saturated sintering aid material to form a polycrystalline diamond table includes subjecting the mixture to a high-pressure/high-temperature process effective to form the polycrystalline diamond body.

11. The method of claim 7 wherein at least saturating a sintering aid material with non-diamond carbon to form a carbon-saturated sintering aid material includes mechanically milling the non-diamond carbon and the sintering aid material together to form the carbon-saturated sintering aid particles.

12. The method of claim 1 wherein the substrate includes a cemented carbide substrate.

13. The method of claim 1, prior to the act of subjecting the assembly to a high-pressure/high-temperature process, further comprising removing at least some leaching by-products from the at least partially leached polycrystalline diamond body.

14. The method of claim 1 wherein subjecting the assembly to a high-pressure/high-temperature process effective to infiltrate at least a portion of the plurality of interstitial regions of the at least partially leached polycrystalline diamond body with at least a portion of the at least carbon-saturated material from the at least carbon-saturated infiltrant layer includes infiltrating a portion of the plurality of interstitial regions of the at least partially leached polycrystalline diamond body adjacent to the substrate with a metallic infiltrant from the substrate.

15. The method of claim 14 wherein the metallic infiltrant includes at least one of cobalt, iron, or nickel.

16. A method of fabricating a polycrystalline diamond compact, comprising:
    providing an at least partially leached polycrystalline diamond body including a plurality of bonded grains exhibiting diamond-to-diamond bonding therebetween and defining a plurality of interstitial regions;

forming an assembly including the at least partially leached polycrystalline diamond body, a cobalt-cemented tungsten carbide substrate including a cobalt cementing constituent, and an at least carbon-saturated infiltrant material positioned between the at least partially leached polycrystalline diamond body, the at least carbon-saturated infiltrant material including at least carbon-saturated material at least saturated with non-diamond carbon; and subjecting the assembly to a high-pressure/high-temperature process effective to infiltrate a portion of the plurality of interstitial regions of the at least partially leached polycrystalline diamond body with at least a portion of the at least carbon-saturated material from the at least carbon-saturated infiltrant material and a portion of the plurality of interstitial regions of the at least partially leached polycrystalline diamond body adjacent to the substrate with a portion of the cobalt cementing constituent from the cobalt-cemented tungsten carbide substrate.

17. The method of claim 16 wherein the at least carbon-saturated material includes carbon-supersaturated material.

18. The method of claim 16 wherein the at least carbon-saturated material includes at least one material selected from the group consisting of cobalt, nickel, iron, copper, aluminum, titanium, tungsten, niobium, zirconium, tantalum, silicon, and boron.

19. The method of claim 16 wherein the at least carbon-saturated material includes at least one member selected from the group consisting of copper particles supersaturated with the non-diamond carbon and nickel particles supersaturated with the non-diamond carbon.

20. A method of fabricating a polycrystalline diamond compact, comprising:

mechanically milling a sintering aid material with non-diamond carbon to form an at least carbon-saturated sintering aid material, wherein the non-diamond carbon includes at least one material selected from the group consisting of lamp black, graphite, carbon-12 graphite, carbon-13 graphite, carbon nanotubes, graphene, amorphous carbon, and fullerenes;

sintering a plurality of diamond particles in the presence of the at least carbon-saturated sintering aid material to form a polycrystalline diamond body;

at least partially leaching the sintering aid material from the polycrystalline diamond body to form an at least partially leached polycrystalline diamond body including a plurality of bonded diamond grains exhibiting diamond-to-diamond bonding therebetween and defining a plurality of interstitial regions;

forming an assembly including the at least partially leached polycrystalline diamond body, a cobalt-cemented tungsten carbide substrate including a cobalt cementing constituent therein, and an at least carbon-saturated infiltrant material positioned between the at least partially leached polycrystalline diamond body, the at least carbon-saturated infiltrant material including at least carbon-saturated material at least saturated with non-diamond carbon; and subjecting the assembly to a high-pressure/high-temperature process effective to infiltrate a portion of the plurality of interstitial regions of the at least partially leached polycrystalline diamond body with at least a portion of the at least carbon-saturated material from the at least carbon-saturated infiltrant material and a portion of the plurality of interstitial regions of the at least partially leached polycrystalline diamond body adjacent to the substrate with a portion of the cobalt cementing constituent from the cobalt-cemented tungsten carbide substrate.

* * * * *